US012609490B2

(12) United States Patent
Kim

(10) Patent No.: US 12,609,490 B2
(45) Date of Patent: Apr. 21, 2026

(54) BOARD CONNECTOR

(71) Applicant: LS MTRON LTD., Anyang-si (KR)

(72) Inventor: Dong Wan Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 456 days.

(21) Appl. No.: 18/278,146

(22) PCT Filed: Mar. 10, 2022

(86) PCT No.: PCT/KR2022/003330
§ 371 (c)(1),
(2) Date: Aug. 21, 2023

(87) PCT Pub. No.: WO2022/197006
PCT Pub. Date: Sep. 22, 2022

(65) Prior Publication Data

US 2024/0145998 A1 May 2, 2024

(30) Foreign Application Priority Data

Mar. 17, 2021 (KR) ........................ 10-2021-0034898
Mar. 8, 2022 (KR) ........................ 10-2022-0029333

(51) Int. Cl.
*H01R 13/6581* (2011.01)
*H01R 13/6596* (2011.01)

(52) U.S. Cl.
CPC ..... *H01R 13/6581* (2013.01); *H01R 13/6596* (2013.01)

(58) Field of Classification Search
CPC ........................ H01R 13/6581; H01R 13/6596
See application file for complete search history.

(56) References Cited

U.S. PATENT DOCUMENTS

2009/0197440 A1* 8/2009 Hirata .................... H01R 12/57 439/83
2014/0273587 A1* 9/2014 Takenaga ............... H01R 13/20 439/345

(Continued)

FOREIGN PATENT DOCUMENTS

JP 2006059589 A * 3/2006 ......... H01R 13/6583
JP 2015115200 A * 6/2015 ......... H01R 13/6275

(Continued)

OTHER PUBLICATIONS

Office Action for related Japanese Application No. 2023-542637; action dated Jul. 2, 2024; (4 pages).

(Continued)

*Primary Examiner* — Peter G Leigh
(74) *Attorney, Agent, or Firm* — K&L Gates LLP

(57) ABSTRACT

The present disclosure relates to a board connector comprising: a plurality of RF contacts for transmitting radio frequency (RF) signals; an insulating portion supporting the RF contacts; a plurality of transmission contacts coupled to the insulating portion; a ground housing to which the insulating portion is coupled; and a first ground contact for providing shielding between the transmission contacts and a first RF contact among the RF contacts based on a first axial direction, wherein the ground housing includes: a ground side wall that surrounds the side surfaces of the inner space; a ground upper wall coupled to the ground side wall; and a first-1 movable ground inner wall coupled to the ground upper wall, and the first-1 movable ground inner wall is moved by being pressed with a ground contact of a counterpart connector that is inserted into the inner space.

20 Claims, 20 Drawing Sheets

(56) References Cited

U.S. PATENT DOCUMENTS

| | | | | |
|---|---|---|---|---|
| 2014/0364003 | A1* | 12/2014 | Yunoki | H01R 12/716 439/374 |
| 2017/0271813 | A1* | 9/2017 | Ge | H01R 13/504 |
| 2018/0151967 | A1 | 5/2018 | Chen et al. | |
| 2018/0198241 | A1* | 7/2018 | Ooi | H01R 13/6597 |
| 2020/0244011 | A1 | 7/2020 | Kitazawa | |

FOREIGN PATENT DOCUMENTS

| | | | | |
|---|---|---|---|---|
| JP | 5887326 | B2 * | 3/2016 | H01R 24/60 |
| JP | 6117415 | B1 * | 4/2017 | H01R 13/6582 |
| JP | 6341876 | B2 * | 6/2018 | H01R 4/028 |
| JP | 2020123438 | A | 8/2020 | |
| JP | 2021009836 | A | 1/2021 | |
| KR | 1020010007060 | | 1/2001 | |
| KR | 1020170015125 | | 2/2017 | |
| KR | 1020180081441 | | 7/2018 | |
| KR | 102053386 | B1 * | 12/2019 | H01R 12/732 |
| KR | 20200008840 | A | 1/2020 | |
| WO | 2017196100 | A2 | 11/2017 | |
| WO | WO-2019021611 | A1 * | 1/2019 | H01R 24/60 |
| WO | 2020039666 | A1 | 2/2020 | |
| WO | WO-2020256396 | A1 * | 12/2020 | H01R 12/73 |

OTHER PUBLICATIONS

Notice of Allowance for related Japanese Application No. 2023-542637; action dated Apr. 25, 2025; (3 pages).

International Search Report for related International Application No. PCT/KR2022/003330; action dated Sep. 22, 2022; (2 pages).

Written Opinion for related International Application No. PCT/KR2022/003330; action dated Sep. 22, 2022; (3 pages).

Office Action for related Japanese Application No. 2023-542637; action dated Nov. 6, 2024; (3 pages).

* cited by examiner

BOARD CONNECTOR

CROSS-REFERENCE TO RELATED APPLICATION

This application is a National Stage of International Application No. PCT/KR2022/003330 filed on Mar. 10, 2022, which claims priority to and the benefit of Korean Patent Application No. 10-2021-0034898, filed on Mar. 17, 2021, and Korean Patent Application No. 10-2022-0029333, filed on Mar. 8, 2022, the disclosure of which is incorporated herein by reference in its entirety.

FIELD

The present disclosure relates to a board connector installed in an electronic device for electrical connection between boards.

BACKGROUND

A connector is provided in various electronic devices for electrical connection. For example, the connector may be installed in an electronic device such as a mobile phone, a computer, a tablet computer, and the like, and thus may electrically connect various components installed in the electronic device to each other.

In general, an RF connector and a board-to-board connector (hereinafter, referred to as a "board connector") are provided in a wireless communication device such as a smartphone, a tablet PC, and the like among electronic devices. The RF connector is to transmit a radio frequency (RF) signal. The board connector is to process digital signals from cameras and the like.

The RF connector and the board connector are mounted on a printed circuit board (PCB). Conventionally, since a number of board connectors and RF connectors are mounted along with a number of components in a limited PCB space, there was a problem in that the PCB mounting area is increased. Therefore, in accordance with the miniaturization trend of smartphones, a technology for optimizing a PCB mounting area into a small area by integrating an RF connector and a board connector is required.

FIG. 1 is a schematic perspective view of a board connector according to the related art.

Referring to FIG. 1, a board connector 100 according to the related art includes a first connector 110 and a second connector 120. The first connector 110 is for being coupled to a first board (not shown). The first connector 110 may be electrically connected to the second connector 120 through a plurality of first contacts 111.

The second connector 120 is for being coupled to a second board (not shown). The second connector 120 may be electrically connected to the first connector 110 through a plurality of second contacts 121.

The board connector 100 according to the related art may electrically connect the first board and the second board to each other as the first contacts 111 and the second contacts 121 are connected to each other. In addition, when some contacts among the first contacts 111 and the second contacts 121 are used as RF contacts for transmitting RF signals, the board connector 100 according to the related art may be implemented to transmit RF signals between the first board and the second board through the RF contacts.

Here, the board connector 100 according to the related art has the following problems.

First, when contacts spaced apart from each other at a relatively close distance among the contacts 111 and 121 are used as the RF contacts, the board connector 100 according to the related art has a problem in that signal transmission is not smoothly performed due to RF signal interference between the RF contacts 111', 111", 121', and 121".

Second, the board connector 100 according to the related art has an RF signal shielding portion 112 at the outermost portion of the connector, and thus radiation of an RF signal to the outside can be shielded, but there is a problem in that shielding between RF signals is not achieved.

Third, in the board connector 100 according to the related art, the RF contacts 111', 111", 121', and 121" each include mounting portions **111*a*', 111*a*", 121*a*', and 121*a*" mounted on the board, and the mounting portions 111', 111", 121', and 121" are disposed to be exposed to the outside. Accordingly, the board connector 100 according to the related art has a problem in that shielding of the mounting portions 111', 111", 121', and 121"** is not achieved.

SUMMARY

The present disclosure has been devised in an effort to solve the problems described above, and is directed to providing a board connector capable of reducing the possibility of RF signal interference between RF contacts.

In order to solve the above problems, the present disclosure may include the following configurations.

The board connector according to the present disclosure may include a plurality of RF contacts for transmitting radio frequency (RF) signals; an insulating portion supporting the RF contacts; a plurality of transmission contacts coupled to the insulating portion; a ground housing to which the insulating portion is coupled; and a first ground contact for providing shielding between the transmission contacts and a first RF contact among the RF contacts based on a first axial direction. The ground housing may include a ground side wall surrounding a side of an inner space, a ground upper wall coupled to the ground side wall, and a first-1 movable ground inner wall coupled to the ground upper wall. The first-1 movable ground inner wall may be moved as it is pressed by the ground contact of the counterpart connector inserted into the inner space.

The board connector according to the present disclosure may include a plurality of RF contacts for RF signal transmission; an insulating portion configured to support the RF contacts; a plurality of transmission contacts coupled to the insulating portion; a ground housing coupled to the insulating portion; and a first ground contact configured to shield between a first RF contact among the RF contacts and transmission contacts based on a first axial direction (X-axis direction), wherein the first ground contact includes a first-1 ground contact shielding between first transmission contacts among the transmission contacts and the first RF contact, and a first-2 ground contact disposed to face the first-1 ground contact based on a second axial direction (Y-axis direction) perpendicular to the first axial direction (X-axis direction). The first-1 ground contact may include a first-1 ground movable arm for being connected to a ground contact of the counterpart connector. The first-1 ground movable arm may be elastically moved as it is pressed by the ground contact of the counterpart connector inserted into the inner space.

According to the present disclosure, the following effects may be achieved.

The present disclosure can implement a shielding function for signals, electromagnetic waves, or the like for RF contacts using a ground housing and a ground contact. Accordingly, the present disclosure can prevent electromagnetic waves generated from RF contacts from interfering with signals of circuit components located around an electronic device, and prevent electromagnetic waves generated from circuit components located around an electronic device from interfering with RF signals transmitted by RF contacts. Therefore, the present disclosure can contribute to improving EMI (Electro Magnetic Interference) shielding performance and EMC (Electro Magnetic Compatibility) performance using the ground housing and the ground contact.

In addition, the present disclosure can improve contact stability between the ground contacts by forming a double contact point with a ground contact of a counterpart connector. Therefore, the present disclosure can further improve shielding performance by stably maintaining contact between the ground contacts even when an impact is applied from the outside.

DETAILED DESCRIPTION

Figure 13:
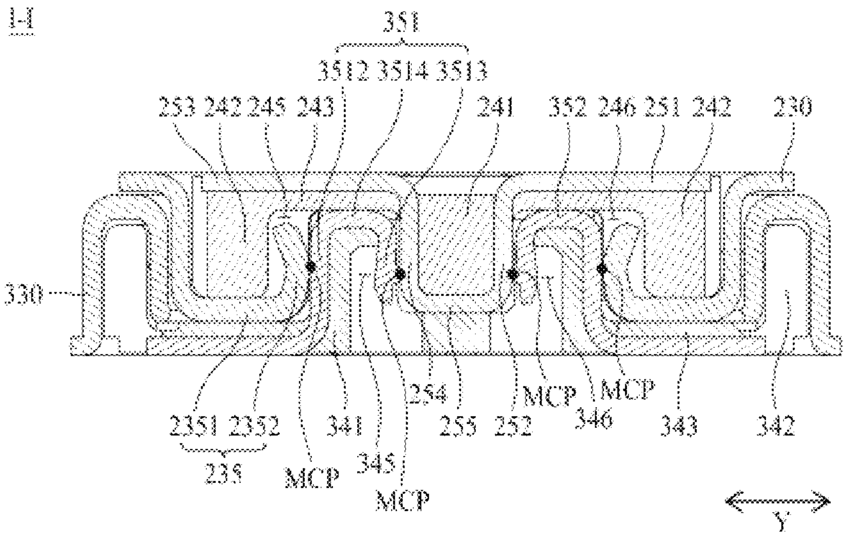
FIG. 13 is a side cross-sectional view showing a state in which a first ground contact in a board connector according to a first embodiment and a first ground contact in a board connector according to a second embodiment are coupled based on line I-I shown in FIG. 12.
Figure 14:
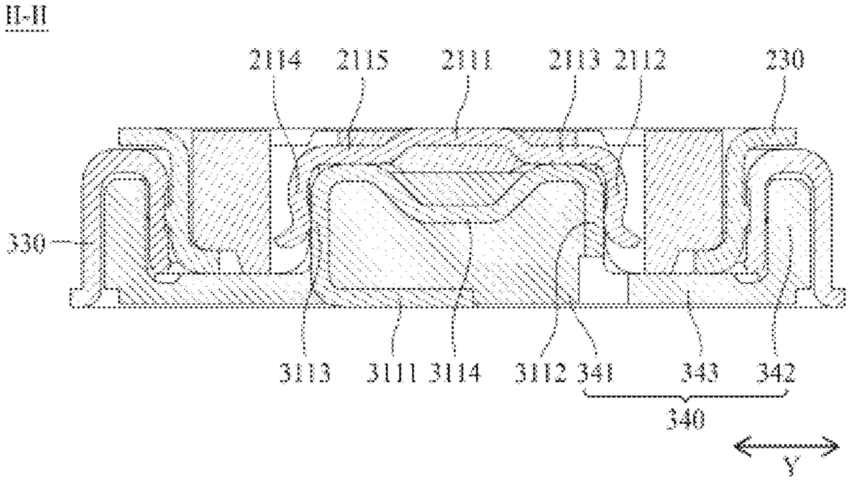
FIG. 14 is a side cross-sectional view showing a state in which a first RF ground contact in a board connector according to a first embodiment and a first RF contact in a board connector according to a second embodiment are coupled based on line II-II shown in FIG. 12.

Hereinafter, an embodiment of the board connector according to the present disclosure will be described in detail with reference to the accompanying drawings. FIGS. 13 and 14 illustrate a state in which the connector according to the first embodiment is coupled to the connector according to the second embodiment by being reversed in the direction illustrated in FIGS. 2 and 3.

Figure 1:
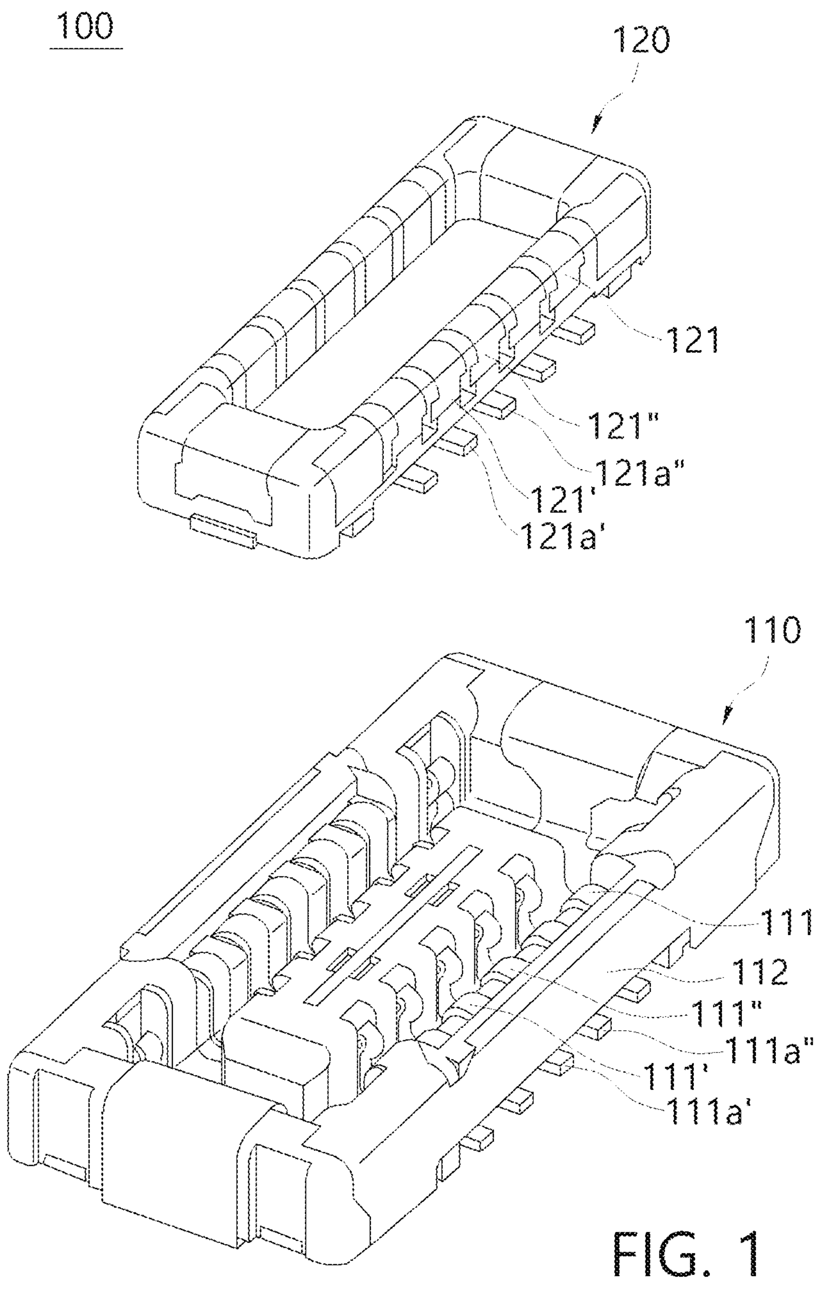
FIG. 1 is a schematic perspective view of a board connector according to the related art.
Figure 2:
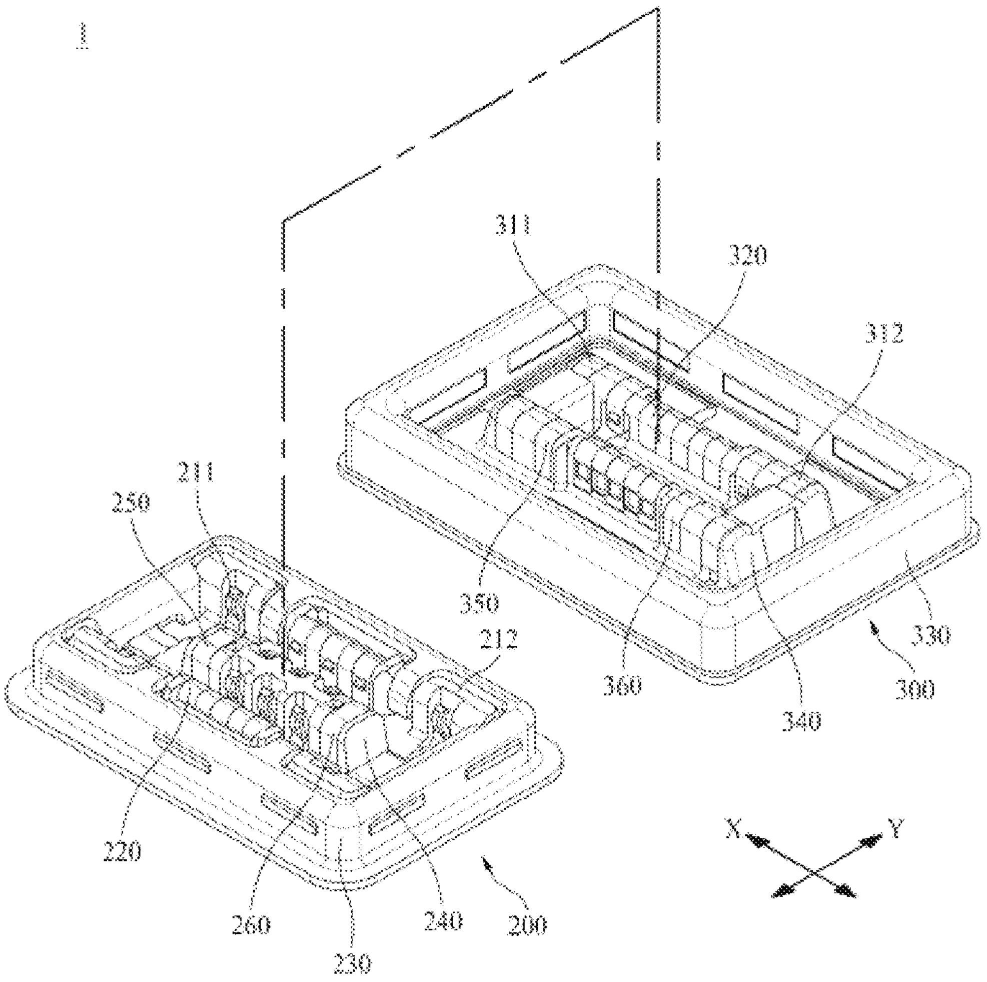
FIG. 2 is a schematic perspective view of a receptacle connector and a plug connector in a board connector according to the present disclosure.

Referring to FIG. 2, the board connector 1 according to the present disclosure may be installed in an electronic device (not shown) such as a mobile phone, a computer, a tablet computer, or the like. The board connector 1 according to the present disclosure may be used to electrically connect a plurality of boards (not shown). The boards may be a printed circuit board (PCB). For example, when the first board and the second board are electrically connected, a receptacle connector mounted on the first board and a plug connector mounted on the second board may be connected to each other. Accordingly, the first board and the second board may be electrically connected to each other through the receptacle connector and the plug connector. The plug connector mounted on the first board and the receptacle connector mounted on the second board may be connected to each other.

The board connector 1 according to the present disclosure may be implemented as the receptacle connector. The board connector 1 according to the present disclosure may be implemented as the plug connector. The board connector 1 according to the present disclosure may be implemented including both the receptacle connector and the plug connector. Hereinafter, an embodiment in which the board connector 1 according to the present disclosure is implemented as the plug connector is defined as a board connector 200 according to the first embodiment, and an embodiment in which the board connector 1 according to the present disclosure is implemented as the receptacle connector is defined as a board connector 300 according to the second embodiment, will be described in detail with reference to the accompanying drawings. In addition, description will be made based on an embodiment in which the board connector 200 according to the first embodiment is mounted on the first board, and the board connector 300 according to the second embodiment is mounted on the second board. Thus, it will be apparent to those skilled in the art to derive an embodiment in which the board connector 1 according to the present disclosure includes both the receptacle connector and the plug connector.

Board Connector According to the First Embodiment 200

Figure 3:
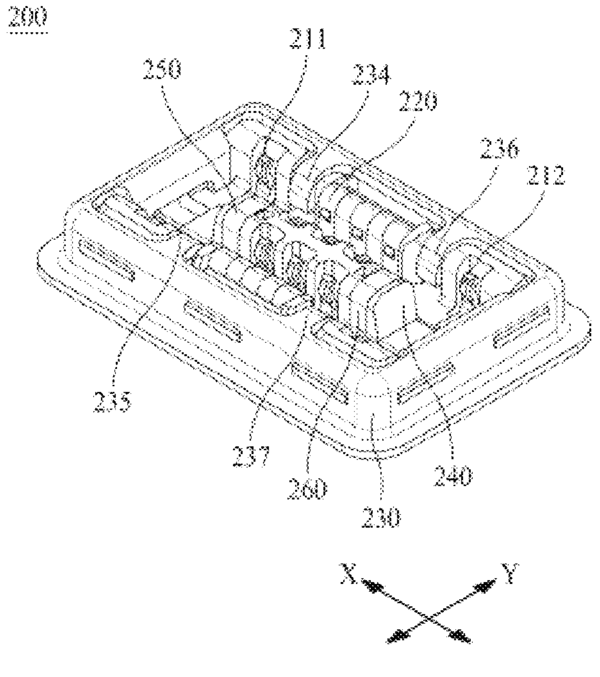
FIG. 3 is a schematic perspective view of a board connector according to a first embodiment.
Figure 4:
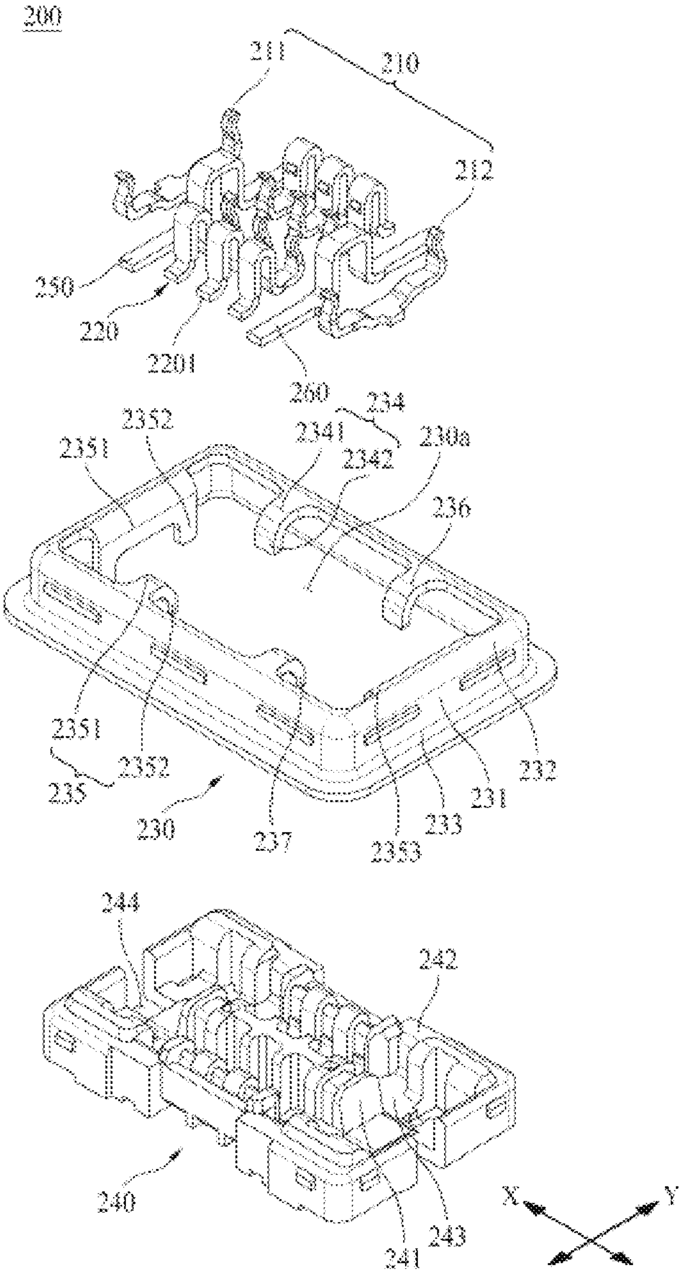
FIG. 4 is a schematic exploded perspective view of a board connector according to a first embodiment.

Referring to FIGS. 2 to 4, the board connector 200 according to the first embodiment may include a plurality of RF contacts 210, a plurality of transmission contacts 220, a ground housing 230, and an insulating portion 240.

The RF contacts 210 are for transmitting radio frequency (RF) signals. The RF contacts 210 may transmit ultra-high frequency RF signals. The RF contacts 210 may be supported on the insulating portion 240. The RF contacts 210 may be coupled to the insulating portion 240 through an assembly process. The RF contacts 210 may be integrally formed with the insulating portion 240 through injection molding.

The RF contacts 210 may be spaced apart from each other. The RF contacts 210 may be mounted on the first board and thus electrically connected to the first board. The RF contacts 210 may be connected to the RF contacts belonging to the counterpart connector, and thus electrically connected to the second board on which the counterpart connector is mounted by being. Accordingly, the first board and the second board may be electrically connected. When the board connector 200 according to the first embodiment is a plug connector, the counterpart connector may be a receptacle connector. When the board connector 200 according to the first embodiment is a receptacle connector, the counterpart connector may be a plug connector.

A first RF contact 211 among the RF contacts 210 and a second RF contact 212 among the RF contacts 210 may be spaced apart from each other along a first axial direction (X-axis direction). The first RF contact 211 and the second RF contact 212 may be supported on the insulating portion 240 at positions spaced apart from each other along the first axial direction (X-axis direction).

The first RF contact 211 may include a first RF mounting member 2111. The first RF mounting member 2111 may be mounted on the first board. Accordingly, the first RF contact 211 may be electrically connected to the first board through the first RF mounting member 2111. The first RF contact 211 may be formed of a material having electrical conductivity. For example, the first RF contact 211 may be formed of a metal. The first RF contact 211 may be connected to any one of RF contacts belonging to the counterpart connector.

The second RF contact 212 may include a second RF mounting member 2121. The second RF mounting member 2121 may be mounted on the first board. Accordingly, the second RF contact 212 may be electrically connected to the first board through the second RF mounting member 2121. The second RF contact 212 may be formed of a material having electrical conductivity. For example, the second RF contact 212 may be formed of a metal. The second RF contact 212 may be connected to any one of RF contacts belonging to the counterpart connector.

Referring to FIGS. 2 to 5, the transmission contacts 220 are coupled to the insulating portion 240. The transmission contacts 220 may perform a function of transmitting a signal, data, and the like. The transmission contacts 220 may be coupled to the insulating portion 240 through an assembly process. The transmission contacts 220 may be integrally molded with the insulating portion 240 through injection molding.

The transmission contacts 220 may be disposed between the first RF contact 211 and the second RF contact 212 based on the first axial direction (X-axis direction). Accordingly, the transmission contacts 220 may be disposed in a space in which the first RF contact 211 and the second RF contact 212 are spaced apart from each other to reduce RF signal interference between the first RF contact 211 and the second RF contact 212. Therefore, the board connector 200 according to the first embodiment may reduce RF signal interference by increasing the spaced apart distance between the first RF contact 211 and the second RF contact 212, and may also improve space utilization for the insulating portion 240 by disposing the transmission contacts 220 in a spaced apart space for this purpose.

The transmission contacts 220 may be spaced apart from each other. The transmission contacts 220 may be mounted on the first board and thus electrically connected to the first board. In this case, a transmission mounting member 2201 belonging to each of the transmission contacts 220 may be mounted on the first board. The transmission contacts 220 may be formed of a material having electrical conductivity. For example, the transmission contacts 220 may be formed of a metal. The transmission contacts 220 may be connected to the transmission contacts belonging to the counterpart connector, and thus electrically connected to the second board on which the counterpart connector is mounted. Accordingly, the first board and the second board may be electrically connected.

The first transmission contacts 221 among the transmission contacts 220 and the second transmission contacts 222 among the transmission contacts 220 may be disposed to be spaced apart from each other along the second axial direction (Y-axis direction). The second axial direction (Y-axis direction) is an axial direction perpendicular to the first axial direction (X-axis direction). The first transmission contacts 221 may be disposed to be spaced apart from each other along the first axial direction (X-axis direction). The second transmission contacts 222 may be disposed to be spaced apart from each other along the first axial direction (X-axis direction).

Meanwhile, although FIGS. 2 to 5 illustrate that the board connector 200 according to the first embodiment includes six transmission contacts 220, the board connector 200 according to the first embodiment is not limited thereto, and may include seven or more transmission contacts 220. The transmission contacts 220 may be disposed to be spaced apart from each other along the first axial direction (X-axis direction) and the second axial direction (Y-axis direction). The first axial direction (X-axis direction) and the second axial direction (Y-axis direction) are axial directions perpendicular to each other.

Referring to FIGS. 2 to 5, the ground housing 230 is coupled with the insulating portion 240. The ground housing 230 may be grounded by being mounted on the first board. Accordingly, the ground housing 230 may implement a shielding function for signals, electromagnetic waves, or the like for the RF contacts 210. In this case, the ground housing 230 may prevent the electromagnetic waves generated from the RF contacts 210 from interfering with signals of circuit components located around the electronic device, and prevent the electromagnetic waves generated from circuit components located around the electronic device from interfering with RF signals transmitted by the RF contacts 210. Accordingly, the board connector 200 according to the first embodiment may contribute to improving EMI (Electro Magnetic Interference) shielding performance and EMC (Electro Magnetic Compatibility) performance using the ground housing 230. The ground housing 230 may be formed of a material having electrical conductivity. For example, the ground housing 230 may be formed of a metal.

The ground housing 230 may be disposed to surround a side of an inner space 230*a*. A portion of the insulating portion 240 may be located in the inner space 230*a*. All of the first RF contacts 211, the second RF contacts 212, and the transmission contacts 220 may be located in the inner space 230*a*. In this case, all of the first RF mounting member 2111, the second RF mounting member 2121, and the transmission mounting members 2201 may also be located in the inner space 230*a*. Therefore, the ground housing 230 may implement a shielding wall for all of the first RF contacts 211 and the second RF contacts 212, thereby enhancing a shielding function for the first RF contacts 211 and the second RF contacts 212, thereby realizing a complete shielding. The counterpart connector may be inserted into the inner space 230*a*.

The ground housing 230 may be disposed to surround all sides based on the inner space 230*a*. The inner space 232 a may be disposed inside the ground housing 230. If the ground housing 230 is entirely formed in the form of a quadrangular ring, the inner space 230*a* may be formed in the form of a rectangular parallelepiped. In this case, the ground housing 230 may be disposed to surround four sides based on the inner space 230*a*.

The ground housing 230 may be integrally formed without a seam. In this case, the ground housing 230 may be formed as a continuous surface without a seam. The ground housing 230 may be integrally formed without a seam by a metal injection molding method such as a metal die casting method, a metal injection molding (MIM) method, or the like. The ground housing 230 may be integrally formed without a seam by a computer numerical control (CNC) processing, a machining center tool (MCT) processing, or the like. Therefore, since the ground housing 230 is formed as a continuous surface without a seam, the RF signal may be prevented from being radiated to a seam portion or a discontinuous surface as compared to the ground housing formed with a seam or a discontinuous surface.

Referring to FIGS. 2 to 5, the insulating portion 240 supports the RF contacts 210. The RF contacts 210 and the transmission contacts 220 may be coupled to the insulating portion 240. The insulating portion 240 may be formed of an insulating material. The insulating portion 240 may be coupled to the ground housing 230 such that the RF contacts 210 are located in the inner space 230*a*.

Referring to FIGS. 2 to 7, the board connector 200 according to the first embodiment may include a first ground contact 250.

The first ground contact 250 is coupled to the insulating portion 240. The first ground contact 250 may be grounded by being mounted on the first board. The first ground contact 250 may be coupled to the insulating portion 240 through an assembly process. The first ground contact 250 may be integrally formed with the insulating portion 240 through injection molding.

The first ground contact 250 may implement a shielding function together with the ground housing 230 for the first RF contact 211. In this case, the first ground contact 250 may be disposed between the first RF contact 211 and the transmission contacts 220 based on the first axial direction (X-axis direction). The first ground contact 250 may be formed of a material having electrical conductivity. For example, the first ground contact 250 may be formed of a metal. When the counterpart connector is inserted into the inner space 230*a*, the first ground contact 250 may be connected to a ground contact belonging to the counterpart connector.

Referring to FIGS. 2 to 7, the board connector 200 according to the first embodiment may include a second ground contact 260.

The second ground contact 260 is coupled to the insulating portion 240. The second ground contact 260 may be grounded by being mounted on the first board. The second ground contact 260 may be coupled to the insulating portion 240 through an assembly process. The second ground contact 260 may be integrally molded with the insulating portion 240 through injection molding.

The second ground contact 260 may implement a shielding function together with the ground housing 230 for the second RF contact 212. The second ground contact 260 may be disposed between the transmission contacts 220 and the second RF contact 212 based on the first axial direction (X-axis direction). The second ground contact 260 may be formed of a material having electrical conductivity. For example, the second ground contact 260 may be formed of a metal. When the counterpart connector is inserted into the inner space 230*a*, the second ground contact 260 may be connected to a ground contact belonging to the counterpart connector.

Referring to FIGS. 2 to 6, the first ground contact 250 may be implemented as follows.

The first ground contact 250 may include the first-1 ground mounting member 251 and the first-1 ground joint member 252.

The first-1 ground mounting member 251 is mounted on the first board. The first-1 ground mounting member 251 may be grounded by being mounted on the first board. Accordingly, the first ground contact 250 may be grounded to the first board through the first-1 ground mounting member 251. In this case, the first-1 ground mounting member 251 may be located between the first RF contact 211 and the first transmission contacts 221 based on the first axial direction (X-axis direction). Accordingly, the first-1 ground mounting member 251 may shield between the first RF contact 211 and the first transmission contacts 221 based on the first axial direction (X-axis direction). The first-1 ground mounting member 251 may protrude from the first-1 ground joint member 252 along the second axial direction (Y-axis direction). The first-1 ground mounting member 251 may protrude from the first-1 ground joint member 252 in a length capable of being connected to the ground housing 230 based on the second axial direction (Y-axis direction). In this case, the first-1 ground mounting member 251 may protrude from the first-1 ground joint member 252 and may be connected to a side wall belonging to the ground housing 230. The first-1 ground mounting member 251 may be formed in a plate shape disposed in a horizontal direction. The first-1 ground mounting member 251 may be mounted on a mounting pattern belonging to the first board.

The first-1 ground joint member 252 is coupled to the first-1 ground mounting member 251. The first-1 ground joint member 252 may be connected to a ground contact of the counterpart connector. Accordingly, the first ground contact 250 may be connected to a ground contact belonging to the counterpart connector through the first-1 ground joint member 252, and thus be electrically connected to the ground contact belonging to the counterpart connector. Therefore, the shielding force of the first ground contact 250 with respect to the first RF contact 211 may be strengthened. The first-1 ground joint member 252 may be formed in a plate shape disposed in the vertical direction. In this case, the first-1 ground joint member 252 may be implemented to be disposed in the vertical direction through bending processing with respect to a plate material.

The first ground contact 250 may include a first-2 ground mounting member 253 and a first-2 ground joint member 254.

The first-2 ground mounting member 253 is mounted on the first board. The first-2 ground mounting member 253 may be grounded by being mounted on the first board. Accordingly, the first ground contact 250 may be grounded to the first board through the first-2 ground mounting member 253. In this case, the first-2 ground mounting member 253 may be located between the first RF contact 211 and the second transmission contacts 222 based on the first axial direction (X-axis direction). Accordingly, the first-2 ground mounting member 253 may shield between the first RF contact 211 and the second transmission contacts 222 based on the first axial direction (X-axis direction). The first-2 ground mounting member 253 may protrude from the first-2 ground joint member 254 along the second axial direction (Y-axis direction). The first-2 ground mounting member 253 may protrude from the first-2 ground joint member 254 in a length capable of being connected to the ground housing 230 based on the second axial direction (Y-axis direction). In this case, the first-2 ground mounting member 253 may protrude from the first-2 ground joint member 254 and may be connected to a side wall belonging to the ground housing 230. The first-2 ground mounting member 253 may be formed in a plate shape disposed in a horizontal direction. The first-2 ground mounting member 253 may be mounted on a mounting pattern belonging to the first board.

Figure 6:
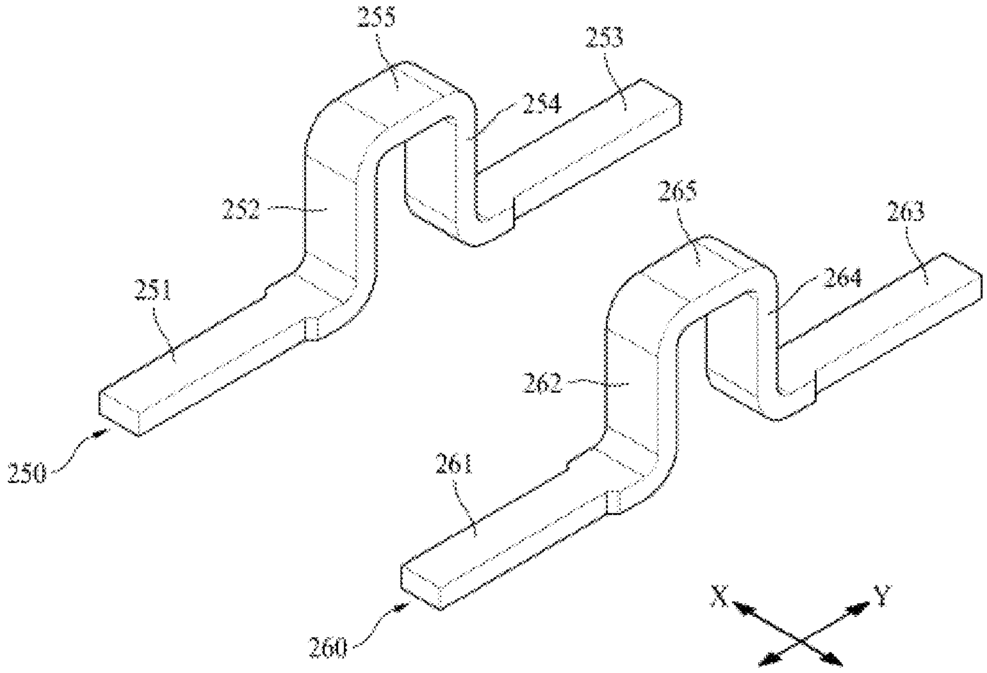
FIG. 6 is a schematic perspective view of a first ground contact in a board connector according to a first embodiment.

As shown in FIG. 6, the first-1 ground mounting member 251 and the first-2 ground mounting member 253 may be spaced apart from each other based on the second axial direction (Y-axis direction). In this case, the first-1 ground mounting member 251 and the first-2 ground mounting member 253 may be spaced apart from each other based on the second axial direction (Y-axis direction) and mounted on the first board. The first-1 ground mounting member 251 and the first-2 ground mounting member 253 may be grounded by being mounted on the first board. Accordingly, the first ground contact 250 may be mounted on the first board through the first-1 ground mounting member 251 and the first-2 ground mounting member 253. The first-1 ground mounting member 251 and the first-2 ground mounting member 253 may be mounted on the board outside of the insulating portion 240. The first-1 ground mounting member 251 and the first-2 ground mounting member 253 may be located between the first RF contact 211 and the transmission contacts 220 based on the first axial direction (X-axis direction). Accordingly, the first-1 ground mounting member 251 and the first-2 ground mounting member 253 may shield between the first RF contact 211 and the transmission contacts 220 based on the first axial direction (X-axis direction).

The first-2 ground joint member 254 is coupled to the first-2 ground mounting member 253. The first-2 ground joint member 254 may be connected to a ground contact of the counterpart connector. Accordingly, the first ground contact 250 may be connected to a ground contact belonging to the counterpart connector through the first-2 ground joint member 254, and thus be electrically connected to the ground contact belonging to the counterpart connector. Therefore, the shielding force of the first ground contact 250 with respect to the first RF contact 211 may be strengthened. The first-2 ground joint member 254 may be formed in a plate shape disposed in the vertical direction. In this case, the first-2 ground joint member 254 may be implemented to be disposed in the vertical direction through bending processing with respect to a plate material.

Referring to FIG. 6, the first-1 ground joint member 252 and the first-2 ground joint member 254 may be spaced apart from each other based on the second axial direction (Y-axis direction). Therefore, the first-1 ground joint member 252 and the first-2 ground joint member 254 may be connected to different positions of the ground contact of the counterpart connector. The first-1 ground joint member 252 and the first-2 ground joint member 254 may be disposed to face each other. The insulating portion 240 may be inserted between the first-1 ground joint member 252 and the first-2 ground joint member 254 to support the first ground contact 250.

When the first ground contact 250 includes the first-1 ground joint member 252 and the first-2 ground joint member 254, the first ground contact 250 may include a first ground connection member 255.

The first ground connection member 255 is coupled to each of the first-1 ground joint member 252 and the first-2 ground joint member 254. The first ground connection member 255 is coupled to each of the first-1 ground joint member 252 and the first-2 ground joint member 254 spaced apart from each other based on the second axial direction (X-axis direction)[a1]. The first-1 ground joint member 252 and the first-2 ground joint member 254 may be connected to each other through the first ground connection member 255. In this case, the first ground connection member 255 may extend in the first axial direction (X-axis direction) to connect the first-1 ground joint member 252 and the first-2 ground joint member 254 to each other. The first ground connection member 255 may be coupled to an upper side of the insulating portion 240. The insulating portion 240 may be inserted between the first ground connection member 255, the first-1 ground joint member 252, and the first-2 ground joint member 254, and thus the first ground contact 250 may be supported by the insulating portion 240. The first ground connection member 255 may be formed in a plate shape disposed in a horizontal direction. In this case, the first ground connection member 255 may be implemented to be disposed in the horizontal direction through bending processing with respect to a plate material.

Figure 9:
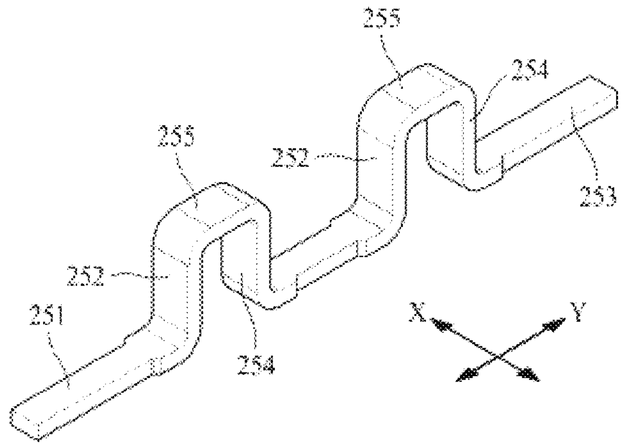
FIG. 9 is a schematic perspective view of a first ground contact having a first ground fixing member and a second ground contact having a second ground fixing member in a board connector according to a first embodiment.

As shown in FIG. 9, the first ground contact 250 may include a first ground fixing member 256.

The first ground fixing member 256 protrudes from the first ground connection member 255. The first ground fixing member 256 may be fixed to the insulating portion 240. Accordingly, the board connector 1 according to the present disclosure may have a stronger force that the first ground contact 250 is fixed to the insulating portion 240 through the first ground fixing member 256. Therefore, since the first ground contact 250 is firmly fixed to the insulating portion 240, the first ground contact 250 may stably maintain contact with the ground contact of the counterpart connector even when an impact is applied to the board connector 1 according to the present disclosure. The first ground fixing member 256 may extend along the first axial direction (X-axis direction). In this case, the first ground fixing member 256 may extend toward an outside of the insulating portion 240. The first ground fixing member 256 may be inserted into the insulating portion 240. Accordingly, the first ground fixing member 256 may be supported by the insulating portion 240.

Figure 8:
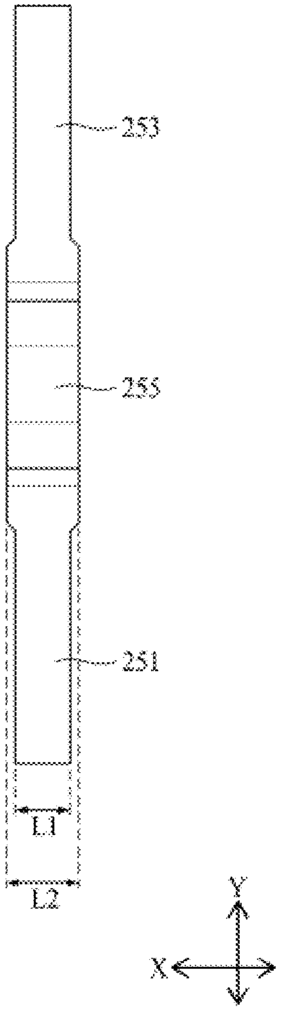
FIG. 8 is a schematic plan view of a first ground contact for explaining widths of a first ground connection member and a first-1 ground mounting member in a board connector according to a first embodiment.

Referring to FIG. 8, the first ground connection member 255 may be formed to have a longer length than each of the first-1 ground mounting member 251 and the first-2 ground mounting member 253 based on the first axial direction (X-axis direction). Therefore, the board connector 200 according to the first embodiment may have a stronger force that the first ground contact 250 is fixed to the insulating portion 240 through the first ground connection member 255. Therefore, since the first ground contact 250 is firmly fixed to the insulating portion 240, the first ground contact 250 may stably maintain contact with the ground contact of the counterpart connector even when an impact is applied to the board connector 1 according to the present disclosure. Each of the first-1 ground mounting member 251 and the first-2 ground mounting member 253 may be formed to have a distance between opposite ends spaced apart from each other [hereinafter referred to as a first length L1] based on the first axial direction (X-axis direction). The first ground connection member 255 may be formed to have a distance between opposite ends spaced apart from each other [hereinafter referred to as a second length L2] based on the first axial direction (X-axis direction). In this case, the second length L2 may be formed to have a longer length than the first length L1 based on the first axial direction (X-axis direction). The first ground connection member 255 is a portion supported by the insulating portion 240. As such, since the area of the portion supported by the insulating portion 240 is formed to be wide, the force fixed by the insulating portion 240 may be stronger.

As such, the board connector 200 according to the first embodiment may implement a first ground loop 250*a* (shown in FIG. 5) for the first RF contact 211 by using the first ground contact 250 and the ground housing 230. Therefore, the board connector 200 according to the first embodiment may further enhance shielding performance for the first RF contact 211 by using the first ground loop 250*a*, thereby realizing complete shielding for the first RF contact 211.

Figure 7:
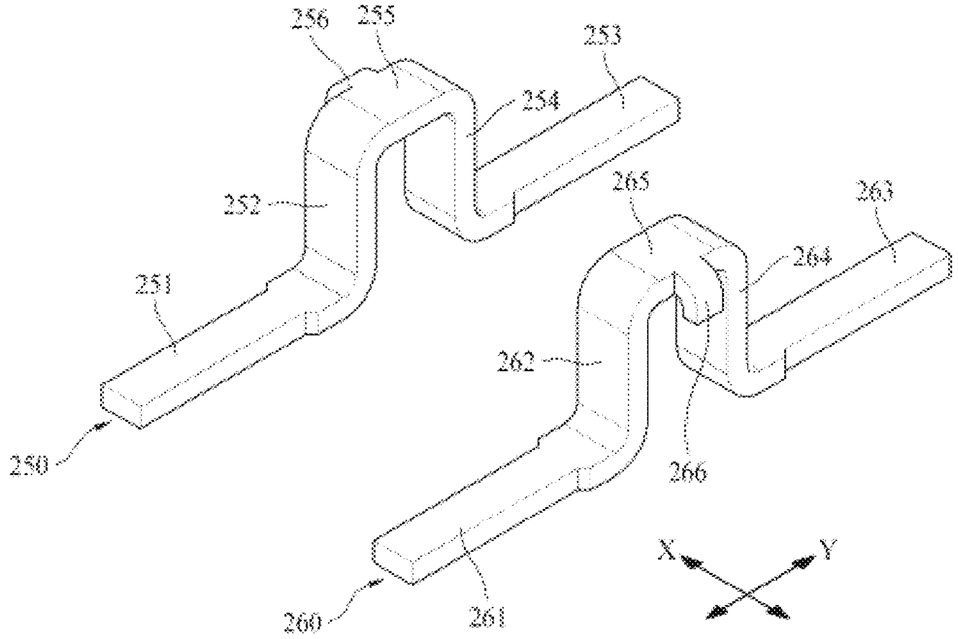
FIG. 7 is a schematic perspective view of a first ground contact and a second ground contact according to another embodiment in a board connector according to a first embodiment.
Figure 10:
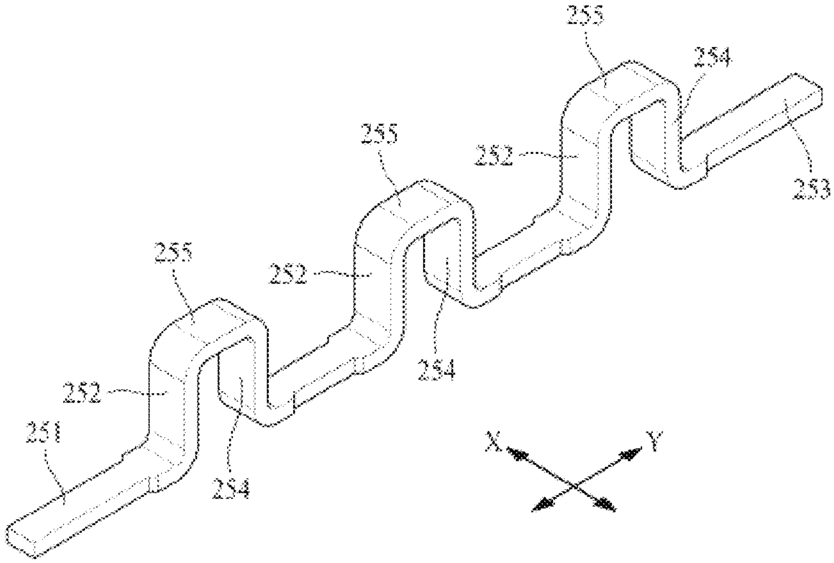
FIG. 10 is a schematic perspective view of a first ground contact and a second ground contact according to yet another embodiment in a board connector according to a first embodiment.
Figure 11:
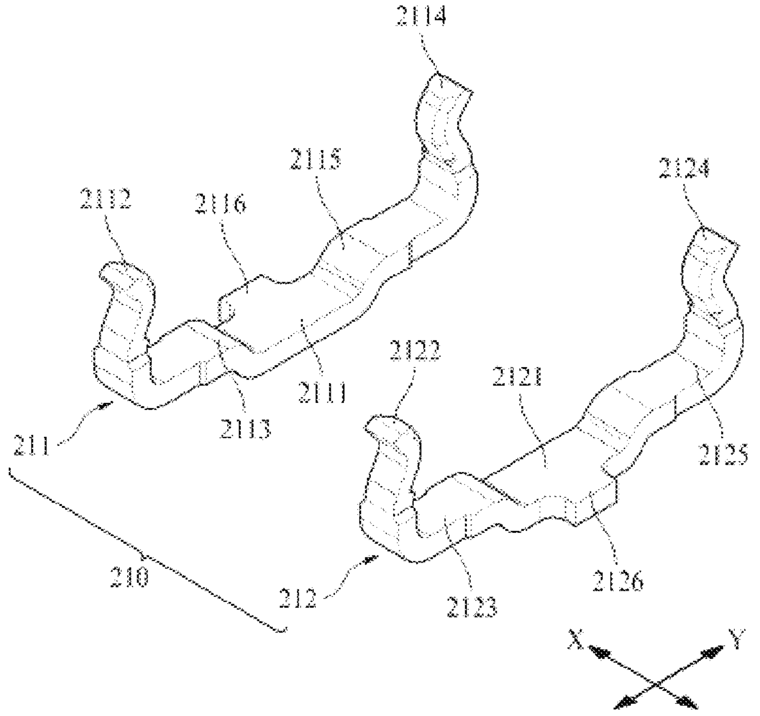
FIG. 11 is a schematic perspective view of a first RF contact and a second RF contact in a board connector according to a first embodiment.
Figure 12:
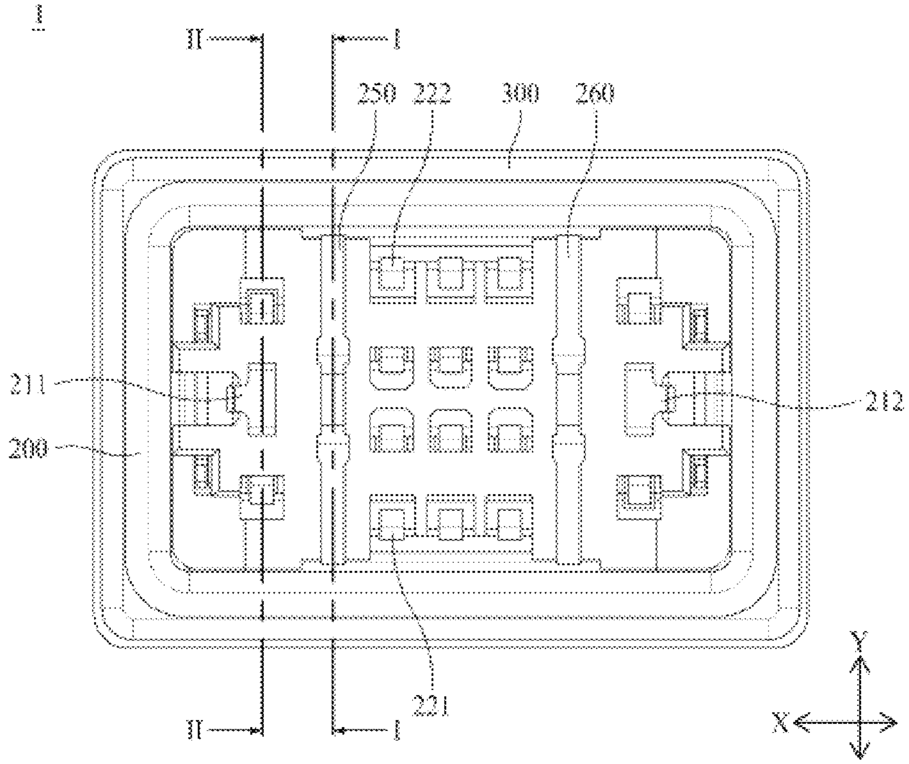
FIG. 12 is a schematic plan view showing a state in which a board connector according to a first embodiment and a board connector according to a second embodiment are coupled.

Referring to FIGS. 7 and 10, the first ground contact 250 may include a plurality of the first ground connection members 255, a plurality of the first-1 ground joint members 252, and a plurality of the first-2 ground joint members 254, respectively.

Each of the first ground connection members 255 may connect different first-1 ground joint member 252 and first-2 ground joint member 254. In this case, the first ground contact 250 may be formed by being bent to form a straight line shape along the second axial direction (X-axis direction) [a2]. The first ground connection members 255, the first-1 ground joint members 252, and the first-2 ground joint members 254 may be disposed between the first-1 ground mounting member 251 and the first-2 ground mounting member 253 based on the second axial direction (Y-axis direction). They may be mounted on the board between the first-2 ground mounting members 253 based on the second axial direction (X-axis direction)[a3].

The second ground contact 260 may include a second-1 ground mounting member 261, a second-1 ground joint member 262, a second-2 ground mounting member 263, a second-2 ground joint member 264, a second ground connection member 265, and a second ground fixing member 266. In this case, the second-1 ground mounting member 261, the second-1 ground joint member 262, the second-2 ground mounting member 263, the second-2 ground joint member 264, the second ground connection member 265, and the second ground fixing member 266 may be implemented to be approximately aligned with the first-1 ground mounting member 251, the first-1 ground joint member 252, the first-2 ground mounting member 253, the first-2 ground joint member 254, the first ground connection member 255, and the first ground fixing member 256, respectively, and thus a detailed description thereof will be omitted.

The board connector 200 according to the first embodiment may implement a second ground loop 260*a* (shown in FIG. 5) for the second RF contact 212 by using the second ground contact 256 and the ground housing 230. Therefore, the board connector 200 according to the first embodiment may further enhance shielding performance for the second RF contact 212 by using the second ground loop 260*a*, thereby realizing complete shielding for the second RF contact 212.

The first ground contact 250 and the second ground contact 260 may be formed in the same shape as each other. Accordingly, the board connector 200 according to the first embodiment may improve ease of manufacturing operations for manufacturing each of the first ground contact 250 and the second ground contact 260. In addition, the board connector 200 according to the first embodiment may further improve ease of manufacturing operations for manufacturing the first ground contact 250 and the second ground contact 260 because the first ground contact 250 and the second ground contact 260 are formed in the same shape as each other and thus are implemented in different arrangement directions.

Referring to FIGS. 2 to 5, in the board connector 200 according to the first embodiment, the ground housing 230 may be implemented as follows.

The ground housing 230 may include a ground side wall 231, a ground upper wall 232, and a ground lower wall 233.

The ground side wall 231 faces the insulating portion 240. The ground side wall 231 may be disposed to face the inner space 230*a*. The ground side wall 231 may be disposed to surround all sides based on the inner space 230*a*.

The ground side wall 231 may be connected to the ground housing of the counterpart connector inserted into the inner space 230*a*. For example, as shown in FIG. 13, the ground side wall 231 may be connected to the ground inner wall 331 belonging to the ground housing 330 of the board connector 300 according to the second embodiment. As such, the board connector 200 according to the first embodiment may further strengthen the shielding function through the connection between the ground housing 230 and the ground housing of the counterpart connector. In addition, the board connector 200 according to the first embodiment may reduce an electrical adverse effect, such as crosstalk, which may be caused by inductance or capacitance between terminals adjacent to each other through the connection between the ground housing 230 and the ground housing of the counterpart connector. In this case, the board connector 200 according to the first embodiment may secure a path through which electromagnetic waves are introduced into at least one ground among the first board and the second board, and thus may further strengthen the EMI shielding performance.

The ground upper wall 232 is coupled to the ground side wall 231. The ground upper wall 232 may be coupled to one end of the ground side wall 231. The ground upper wall 232 may protrude from the ground side wall 231 toward the inner space 230*a*. The ground upper wall 232 may be connected to the ground housing of the counterpart connector inserted into the inner space 230*a*. Accordingly, since the ground upper wall 232 and the ground side wall 231 are connected to the ground housing of the counterpart connector, the board connector 200 according to the second embodiment may further strengthen the shielding function by increasing a contact area between the ground housing 230 and the ground housing of the counterpart connector.

The ground lower wall 233 is coupled to the ground side wall 231. The ground lower wall 233 may be coupled to the other end of the ground side wall 231. The ground lower wall 233 may protrude from the ground side wall 231 toward the opposite side of the inner space 230*a*. The ground lower wall 233 may be disposed to surround all sides based on the ground side wall 231. The ground lower wall 233 and the ground side wall 231 may be implemented as a shielding wall that surrounds a side of the inner space 230*a*. The first RF contact 211 and the second RF contact 212 may be located in the inner space 230*a*, surrounded by the shielding wall. Accordingly, the ground housing 230 may implement a shielding function for the RF contacts 210 using a shielding wall. Therefore, the board connector 200 according to the first embodiment may contribute to further improving EMI shielding performance and EMC performance by using the shielding wall. The ground lower wall 233 may be grounded by being mounted on the first board. In this case, the ground housing 230 may be grounded through the ground lower wall 233.

The ground lower wall 233 and the ground upper wall 232 may be formed in a plate shape disposed in the horizontal direction, and the ground side wall 231 may be formed in a plate shape disposed in the vertical direction. The ground lower wall 233, the ground upper wall 232, and the ground side wall 231 may be integrally formed.

Here, the ground housing 230 may implement a shielding function together with the first ground contact 250 for the first RF contact 211. The ground housing 230 may implement a shielding function together with the second ground contact 260 for the second RF contact 212.

Figure 5:
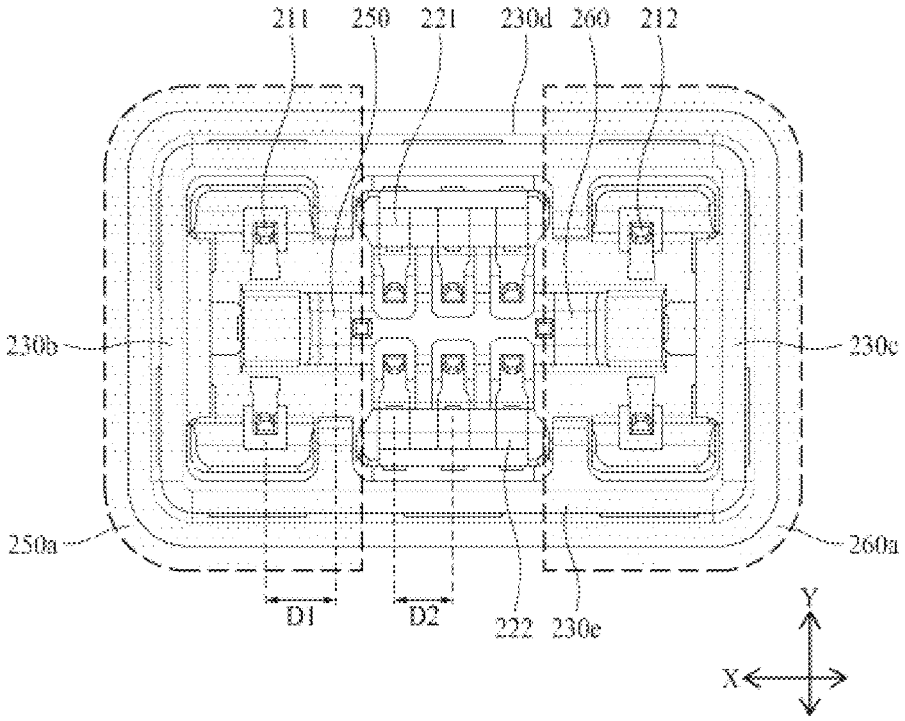
FIG. 5 is a conceptual plan view for explaining a ground loop in a board connector according to a first embodiment.

In this case, as shown in FIG. 5, the ground housing 230 may include a first shielding wall 230*b*, a second shielding wall 230*c*, a third shielding wall 230*d*, and a fourth shielding wall 230*e*. The first shielding wall 230*b*, the second shielding wall 230*c*, the third shielding wall 230*d*, and the fourth shielding wall 230*e* may be implemented by the ground side wall 231, the ground upper wall 232, and the ground lower wall 233, respectively. The first shielding wall 230*b* and the second shielding wall 230*c* are disposed to be opposite each other based on the first axial direction (X-axis direction). The first RF contact 211 and the second RF contact 212 may be located between the first shielding wall 230*b* and the second shielding wall 230*c* based on the first axial direction (X-axis direction). The first RF contact 211 may be positioned at a position where the distance separated from the first shielding wall 230*b* is shorter than the distance separated from the second shielding wall 230*c* based on the first axial direction (X-axis direction). The second RF contact 212 may be positioned at a position where the distance separated from the second shielding wall 230*c* is shorter than the distance separated from the first shielding wall 230*b* based on the first axial direction (X-axis direction). The third shielding wall 230*d* and the fourth shielding wall 230*e* are disposed to be opposite each other based on the second axial direction (Y-axis direction). The first RF contact 211 and the second RF contact 212 may be located between the third shielding wall 230*d* and the fourth shielding wall 230*e* based on the second axial direction (Y-axis direction).

The first ground contact 250 may be disposed between the first RF contact 211 and the transmission contacts 220 based on the first axial direction (X-axis direction). Accordingly, the first RF contact 311 may be positioned between the first shielding wall 230*b* and the first ground contact 250 based on the first axial direction (the X-axis direction), and may be positioned between the third shielding wall 230*d* and the fourth shielding wall 230*e* based on the second axial direction (the Y-axis direction). Therefore, the board connector 300 according to the second embodiment may strengthen a shielding function for the first RF contact 311 by using the first ground contact 250, the first shielding wall 230*b*, the third shielding wall 230*d*, and the fourth shielding wall 230*e*. The first ground contact 250, the first shielding wall 230*b*, the third shielding wall 230*d*, and the fourth shielding wall 230*e* may implement the first ground loop 250*a* (shown in FIG. 5) for the first RF contact 311. Therefore, the board connector 200 according to the first embodiment may further enhance shielding function for the first RF contact 211 by using the first ground loop 250*a*, thereby realizing complete shielding for the first RF contact 211.

The second ground contact 260 may be disposed between the second RF contact 212 and the transmission contacts 220 based on the first axial direction (X-axis direction). Accordingly, the second RF contact 212 may be positioned between the first shielding wall 230*b* and the second ground contact 260 based on the first axial direction (the X-axis direction), and may be positioned between the third shielding wall 230*d* and the fourth shielding wall 230*e* based on the second axial direction (the Y-axis direction). Therefore, the board connector 300 according to the second embodiment may strengthen a shielding function for the second RF contact 212 by using the second ground contact 260, the first shielding wall 230*b*, the third shielding wall 230*d*, and the fourth shielding wall 230*e*. The second ground contact 260, the first shielding wall 230*b*, the third shielding wall 230*d*, and the fourth shielding wall 230*e* may implement the second ground loop 260*a* (shown in FIG. 5) for the first RF contact 311. Therefore, the board connector 200 according to the first embodiment may further enhance shielding function for the second RF contact 212 by using the second ground loop 260*a*, thereby realizing complete shielding for the second RF contact 212.

The first RF contact 211 may be disposed at a position spaced apart at the same distance from each of the first shielding wall 230*b* and the first ground contact 250 based on the first axial direction (X-axis direction), and may be disposed at a position spaced apart at the same distance from each of the third shielding wall 230*d* and the fourth shielding wall 230*e* based on the second axial direction (Y-axis direction). Accordingly, the first RF contact 211 may be disposed in the middle of the first shielding wall 230*b* and the first ground contact 250 based on the first axial direction (the X-axis direction), and may be disposed in the middle of the third shielding wall 230*d* and the fourth shielding wall 230*e* based on the second axial direction (the Y-axis direction). That is, the first RF contact 211 may be disposed in the middle of the first ground loop 250*a*. Therefore, the board connector 200 according to the first embodiment may minimize a deviation in shielding performance for the first RF contact 211 by equally disposing a distance from each portion implementing shielding for the first RF contact 211.

The second RF contact 212 may be disposed at a position spaced apart at the same distance from each of the second shielding wall 230*c* and the second ground contact 260 based on the first axial direction (X-axis direction), and may be disposed at a position spaced apart at the same distance from each of the third shielding wall 230*d* and the fourth shielding wall 230*e* based on the second axial direction (Y-axis direction). Accordingly, it may be disposed in the second middle. Accordingly, the second RF contact 212 may be disposed in the middle of the second shielding wall 230*c* and the second ground contact 260 based on the first axial direction (the X-axis direction), and may be disposed in the middle of the third shielding wall 230*d* and the fourth shielding wall 230*e* based on the second axial direction (the Y-axis direction). That is, the second RF contact 212 may be disposed in the middle of the second ground loop 260*a*. Therefore, the board connector 200 according to the first embodiment may minimize a deviation in shielding performance for the second RF contact 212 by equally disposing a distance from each portion implementing shielding for the second RF contact 212.

Referring to FIGS. 2 to 5, the ground housing 230 may include a first-1 movable ground inner wall 234.

The first-1 movable ground inner wall 234 is elastically moved as it is pressed by a ground contact of a counterpart connector inserted into the inner space 230*a*. Accordingly, the board connector 200 according to the first embodiment may stably maintain a connection with the ground contact of the counterpart connector even when an impact is applied from the outside, thanks to the first-1 movable ground inner wall 234. Accordingly, as the contact stability of the board connector 1 according to the present disclosure is further improved, shielding performance for the first RF contact 211 may be further strengthened. The first-1 movable ground inner wall 234 is coupled to the ground upper wall 232. In this case, the first-1 movable ground inner wall 234 may protrude from the ground upper wall 232. The first-1 movable ground inner wall 234 may extend toward the first ground contact 250. In this case, the first-1 movable ground inner wall 234 may extend toward the first-1 ground joint member 252.

Referring to FIGS. 2 to 5, FIG. 12, and FIG. 13, the first-1 movable ground inner wall 234 and the first-1 ground joint member 252 may be disposed to be spaced apart from each other based on a second axial direction (Y-axis direction) perpendicular to the first axial direction (X-axis direction). Accordingly, the ground contact of the counterpart connector may be inserted between the first-1 movable ground inner wall 234 and the first-1 ground joint member 252. The first-1 movable ground inner wall 234 and the first-1 ground joint member 252 may be disposed to face each other based on the second axial direction (Y-axis direction). Accordingly, the first-1 movable ground inner wall 234 and the first-1 ground joint member 252 may be connected to different portions of the ground contact of the counterpart connector. Therefore, the board connector 200 according to the first embodiment may implement a double contact point with the ground contact of the counterpart connector through the first-1 movable ground inner wall 234 and the first-1 ground joint member 252. Accordingly, the board connector 1 according to the present disclosure may stably maintain contact between contacts even when an impact is applied from the outside.

Referring to FIGS. 3, 4, and 13, the first-1 movable ground inner wall 234 may include a first-1 inner wall connection member 2341 and a first-1 movable arm 2342.

The first-1 inner wall connection member 2341 is coupled to the ground housing 230. The first-1 inner wall connection member 2341 may be coupled to the ground upper wall 232. In this case, the first-1 inner wall connection member 2341 may protrude from the ground upper wall 232 toward the inner space 230*a*. The first-1 inner wall connection member 2341 may be coupled to each of the ground upper wall 232 and the first-1 movable arm 2342. Accordingly, the first-1 inner wall connection member 2341 may connect the ground upper wall 232 and the first-1 movable arm 2342.

The first-1 movable arm 2342 is for being connected to the ground contact of the counterpart connector. As the first-1 movable arm 2342 may be elastically moved with respect to a portion coupled to the first inner wall connection member 2341 as it is pressed against the ground contact of the counterpart connector. Accordingly, the first-1 movable ground inner wall 234 may stably maintain connection with the ground contact of the counterpart connector inserted between the first-1 movable ground inner wall 234 and the first ground contact 250 through the first-1 movable arm 2342. Therefore, the board connector 1 according to the present disclosure may stably maintain ground performance even when an impact is applied from the outside.

Referring to FIGS. 2 to 5, the ground housing 230 may include a first-2 movable ground inner wall 235.

Referring to FIGS. 2 to 5, FIG. 12, and FIG. 13, the first-2 movable ground inner wall 235 and the first-2 ground joint member 254 may be disposed to be spaced apart from each other based on a second axial direction (Y-axis direction) perpendicular to the first axial direction (X-axis direction). Accordingly, the ground contact of the counterpart connector may be inserted between the first-2 movable ground inner wall 235 and the first-2 ground joint member 254. The first-2 movable ground inner wall 235 and the first-2 ground joint member 254 may be disposed to face each other based on the second axial direction (Y-axis direction). Accordingly, the first-2 movable ground inner wall 235 and the first-2 ground joint member 254 may be connected to different portions of the ground contact of the counterpart connector. Therefore, the board connector 200 according to the first embodiment may implement a double contact point with the ground contact of the counterpart connector through the first-1 movable ground inner wall 234 and the first-1 ground joint member 252. Accordingly, the board connector 1 according to the present disclosure may stably maintain contact between contacts even when an impact is applied from the outside.

The first-2 movable ground inner wall 235 may include a first-2 inner wall connection member 2351 and a first-2 movable arm 2352. In this case, the first-2 inner wall connection member 2351 and the first-2 movable arm 2352 may be implemented to be approximately aligned with the first-1 movable ground inner wall 2341 and the first-1 movable arm 2342, respectively, and thus a detailed description thereof will be omitted.

In addition, the board connector 200 according to the first embodiment may include a second-1 movable ground inner wall 236 and a second-2 movable ground inner wall 237. The second-1 movable ground inner wall 236 and the second-2 movable ground inner wall 237 may implement a shielding function together with the second ground contact 260 for the second RF contact 212. In this case, the second-1 movable ground inner wall 236 and the second-2 movable ground inner wall 237 may be implemented to be approximately aligned with the first-1 movable ground inner wall 234 and the first-2 movable ground inner wall 235, respectively, and thus a detailed description thereof will be omitted.

Referring to FIGS. 2 to 4, in the board connector 200 according to the first embodiment, the insulating portion 240 may be implemented as follows. The insulating portion 240 may include an insulating member 241, an insertion member 242, and a connection member 243.

The insulating member 241 supports the RF contacts 210 and the transmission contacts 220. The insulating member 241 may be located in the inner space 230*a*. The insulating member 241 may be located inside the ground side wall 231. The insulating member 241 may be inserted into the inner space belonging to the counterpart connector. The insertion member 242 is inserted between the ground side wall 231 and the first-1 movable ground inner wall 234. As the insertion member 242 is inserted between the ground side wall 231 and the first-1 movable ground inner wall 234, the insulating portion 240 may be coupled to the ground housing 230. The insertion member 242 may be inserted between the ground side wall 231 and the first-1 movable ground inner wall 234 in an interference fit method. The insertion member 242 may be disposed outside the insulating member 241. The insertion member 242 may be disposed to surround the outside of the insulating member 241.

Referring to FIG. 13, the insertion member 242 may include a first-1 movable groove 245.

The first-1 movable groove 245 is for inserting the first-1 movable ground inner wall 234. The first-1 movable ground inner wall 234 may be inserted into the first-1 movable groove 245 as it is pressed by the ground contact of the counterpart connector. Accordingly, the first-1 movable ground inner wall 234 may stably maintain connection with the ground contact of the counterpart connector inserted between the first-1 movable ground inner wall 234 and the first ground contact 250 through the first-1 movable groove 245. Therefore, the board connector 1 according to the present disclosure may further enhance shielding performance even when an impact is applied from the outside.

The connection member 243 is coupled to each of the insertion member 242 and the insulating member 241. The insertion member 242 and the insulating member 241 may be connected to each other through the connection member 243. Based on the vertical direction, the connection member 243 may be formed to have a smaller thickness than the insertion member 242 and the insulating member 241. Accordingly, a space may be provided between the insertion member 242 and the insulating member 241 and the counterpart connector may be inserted into the corresponding space. The connection member 243, the insertion member 242, and the connection member 243 may be integrally formed.

Meanwhile, referring to FIGS. 2 to 4, and 11, the first RF contact 211 may be implemented as follows. The first RF contact 211 may include a first-1 RF joint member 2112 and a first-1 RF connection member 2113.

The first-1 RF joint member 2112 is for being connected to the RF contact of the counterpart connector. The first RF contact 211 may be electrically connected to the RF contact belonging to the counterpart connector by being connected to the RF contact belonging to the counterpart connector through the first-1 RF joint member 2112. The first-1 RF joint member 2112 may be coupled to the first-1 RF connection member 2113.

The first-1 RF connection member 2113 is coupled to one side of the first RF mounting member 2111 based on the second axial direction (Y-axis direction). The first-1 RF connection member 2113 may be coupled to each of the first RF mounting member 2111 and the first-1 RF joint member 2112. The first-1 RF connection member 2113 may be coupled to each of the first RF mounting member 2111 and the first-1 RF joint member 2112 to connect the first RF mounting member 2111 and the first-1 RF joint member 2112.

The first RF contact 211 may include a first-2 RF joint member 2114 and a first-2 RF connection member 2115.

The first-2 RF joint member 2114 is for being connected to the RF contact of the counterpart connector. The first RF contact 211 may be electrically connected to the RF contact belonging to the counterpart connector by being connected to the RF contact belonging to the counterpart connector through the first-2 RF joint member 2114. The first-2 RF joint member 2114 may be disposed to be spaced apart from the first-1 RF joint member 2112 based on the second axial direction (Y-axis direction). In this case, the first-2 RF joint member 2114 may be disposed to face the first-1 RF joint member 2112 based on the second axial direction (Y-axis direction). The RF contact of the counterpart connector may be inserted between the first-2 RF joint member 2114 and the first-1 RF joint member 2112.

The first-2 RF connection member 2115 is coupled to the other side of the first RF mounting member 2111 based on the second axial direction (Y-axis direction). The first-2 RF connection member 2115 may be coupled to each of the first RF mounting member 2111 and the first-2 RF joint member 2114. The first-2 RF connection member 2115 may be coupled to each of the first RF mounting member 2111 and the first-2 RF joint member 2114 to connect the first RF mounting member 2111 and the first-2 RF joint member 2114.

The first RF contact 211 may include a first RF carrier member 2116.

The first RF carrier member 2116 protrudes from the first RF mounting member 2111. The first RF carrier member 2116 may protrude from the first RF mounting member 2111 along the first axial direction (X-axis direction). The first RF carrier member 2116 may protrude from the first RF mounting member 2111 toward the first shielding wall 230*b*. The first RF carrier member 2116 may be mounted on the first board at a position protruding toward the first shielding wall 230*b*. In this case, the first RF carrier member 2116 may be connected to a circuit line disposed on the first board at the side of the first shielding wall 230*b*. As such, since the first RF carrier member 2116 is disposed at a position different from a position at which the first-1 RF joint member 2112 or the first-2 RF joint member 2114 is formed, in the board connector 200 according to the first embodiment, the first RF contact 211 may form a double contact point structure with the RF contact of the counterpart connector through the first RF carrier member 2116. The first RF contact 211 may be manufactured through bending processing with respect to a plate material.

The second RF contact 212 may include a second-1 RF joint member 2122, a second-1 RF connection member 2123, a second-2 RF joint member 2124, a second-2 RF connection member 2125, and a second RF carrier member 2126. In this case, the second-1 RF joint member 2122, the second-1 RF connection member 2123, the second-2 RF joint member 2124, the second-2 RF connection member 2125, and the second RF carrier member 2126 may be implemented to be approximately aligned with the first-1 RF joint member 2112, the first-1 RF connection member 2113, the first-2 RF joint member 2114, the first-2 RF connection member 2115, and the first RF carrier member 2116, respectively, and thus a detailed description thereof will be omitted.

Meanwhile, referring to FIG. 5, the first RF contact 211 may be disposed to be spaced apart from the first ground contact 250 based on the first axial direction (X-axis direction). In this case, the first RF contact 211 may be disposed to be spaced apart from the first ground contact 250 by a first distance D1 based on the first axial direction (X-axis direction). The transmission contacts 220 may be disposed to be spaced apart from each other based on the first axial direction (X-axis direction). In this case, the transmission contacts 220 may be disposed to be spaced apart from each other by a second distance D2 based on the first axial direction (X-axis direction). In this case, the distance at which the first RF contact 211 and the first ground contact 250 are spaced apart from each other based on the first axial direction (X-axis direction) may be equal to or longer than the distance at which the transmission contacts 220 are spaced apart from each other. That is, the first distance D1 may be equal to or longer than the second distance D2. Accordingly, the first RF contact 211 may be disposed to be spaced apart from each of the first shielding wall 230*b* and the first ground contact 250 by the same distance based on the first axial direction (X-axis direction). Therefore, the board connector 200 according to the first embodiment may minimize a deviation in shielding performance for the first RF contact 211 by equally disposing a distance from each portion implementing shielding for the first RF contact 211.

Board Connector According to the Second Embodiment 300

Figure 15:
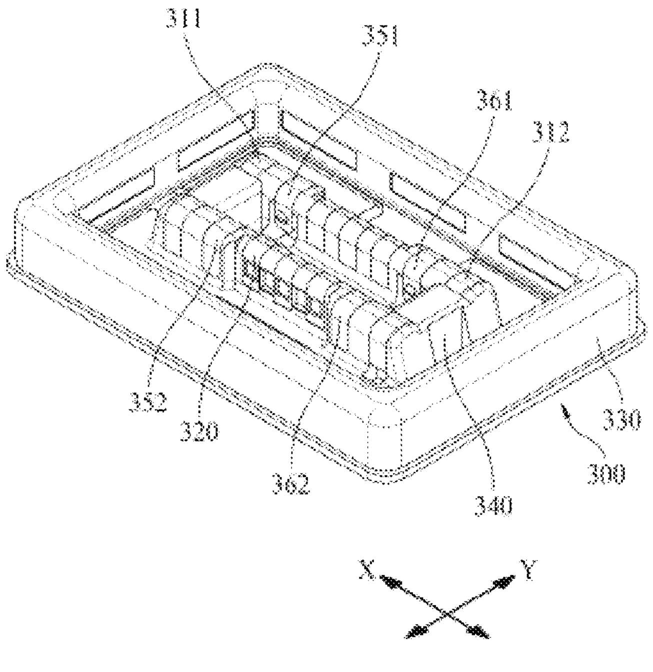
FIG. 15 is a schematic perspective view of a board connector according to a second embodiment.
Figure 16:
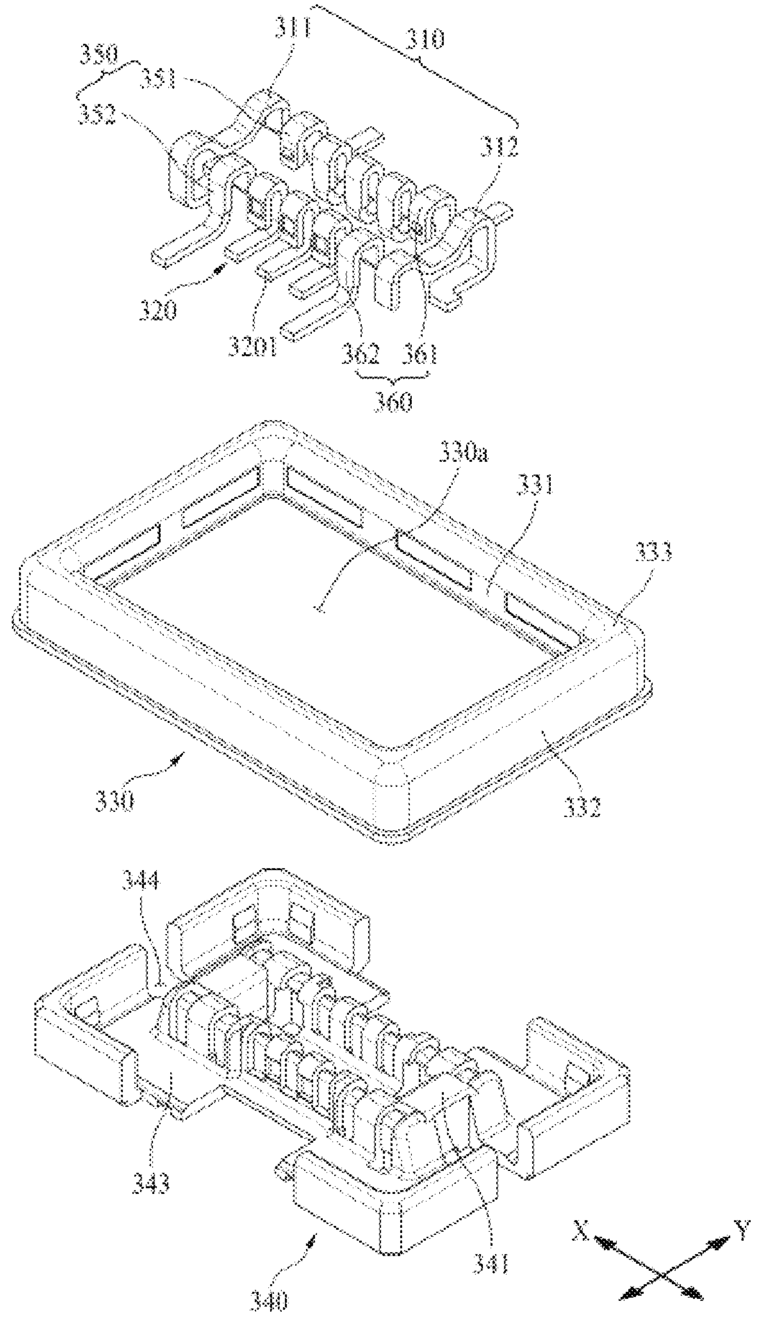
FIG. 16 is a schematic exploded perspective view of a board connector according to a second embodiment.

Referring to FIGS. 2, 15, and 16, the board connector 300 according to the second embodiment may be mounted on the second board. When the board connector 300 according to the second embodiment and a counterpart connector are assembled to be coupled to each other, the second board on which the board connector 300 according to the second embodiment is mounted and the first board on which the counterpart connector is mounted may be electrically connected to each other. In this case, the counterpart connector may be implemented as the board connector 200 according to the first embodiment. Meanwhile, the counterpart connector in the board connector 200 according to the first embodiment may be implemented as the board connector 300 according to the second embodiment.

The board connector 300 according to the second embodiment may include a plurality of RF contacts 310, a plurality of transmission contacts 320, a ground housing 330, and an insulating portion 340. Since the RF contacts 310, the transmission contacts 320, the ground housing 330, and the insulating portion 340 may be implemented to be approximately aligned with the RF contacts 210, the transmission contacts 220, the ground housing 230, and the insulating portion 240 in the board connector 200 according to the first embodiment described above, differences will be mainly described below.

A first RF contact 311 among the RF contacts 310 and a second RF contact 312 among the RF contacts 310 may be supported on the insulating portion 340 at positions spaced apart from each other along the first axial direction (X-axis direction). The first RF contact 311 may include a first RF mounting member 3111 for being mounted on the second board. The second RF contact 312 may include a second RF mounting member 3121 for being mounted on the second board.

The transmission contacts 320 may be disposed between the first RF contact 311 and the second RF contact 312 based on the first axial direction (X-axis direction). The first transmission contacts 321 among the transmission contacts 320 and the second transmission contacts 322 among the transmission contacts 320 may be disposed to be spaced apart from each other along the second axial direction (Y-axis direction). The first transmission contacts 321 may be disposed to be spaced apart from each other along the first axial direction (X-axis direction). The second transmission contacts 322 may be disposed to be spaced apart from each other along the first axial direction (X-axis direction).

The ground housing 330 is coupled to the insulating portion 340. The ground housing 330 may be grounded by being mounted on the second board. The ground housing 330 may be disposed to surround a side of an inner space 330*a*. The insulating portion 340 may be located in the inner space 330*a*. All of the first RF contacts 311, the second RF contacts 312, and the transmission contacts 320 may be located in the inner space 330*a*. In this case, all of the first RF mounting member 3111, the second RF mounting member 3121, and the transmission mounting members 3201 may also be located in the inner space 330*a*. The counterpart connector may be inserted into the inner space 330*a*. In this case, a part of the counterpart connector may be inserted into the inner space 330*a*, and a part of the board connector 300 according to the second embodiment may be inserted into an inner space belonging to the counterpart connector. The ground housing 330 may be disposed to surround all sides based on the inner space 330*a*.

The insulating portion 340 supports the RF contacts 310. The RF contacts 310 and the transmission contacts 320 may be coupled to the insulating portion 340. The insulating portion 340 may be coupled to the ground housing 330 such that the RF contacts 310 and the transmission contacts 320 are located in the inner space 330*a*.

Referring to FIGS. 15 to 18, the board connector 300 according to the second embodiment may include a first ground contact 350 and a second ground contact 360. Since the first ground contact 350 and the second ground contact 360 may be implemented to be approximately aligned with the first ground contact 250 and the second ground contact 260 in the board connector 200 according to the first embodiment described above, respectively, differences will be mainly described below.

The first ground contact 350 may implement a shielding function together with the ground housing 330 for the first RF contact 311. The first ground contact 350 may be disposed between the first RF contact 311 and the transmission contacts 320 based on the first axial direction (X-axis direction). When the counterpart connector is inserted into the inner space 330*a*, the first ground contact 350 may be connected to a ground contact belonging to the counterpart connector.

The second ground contact 360 may implement a shielding function together with the ground housing 330 for the second RF contact 312. The second ground contact 360 may be disposed between the transmission contacts 320 and the second RF contact 212 based on the first axial direction (X-axis direction). When the counterpart connector is inserted into the inner space 330*a*, the second ground contact 360 may be connected to a ground contact belonging to the counterpart connector.

Figure 18:
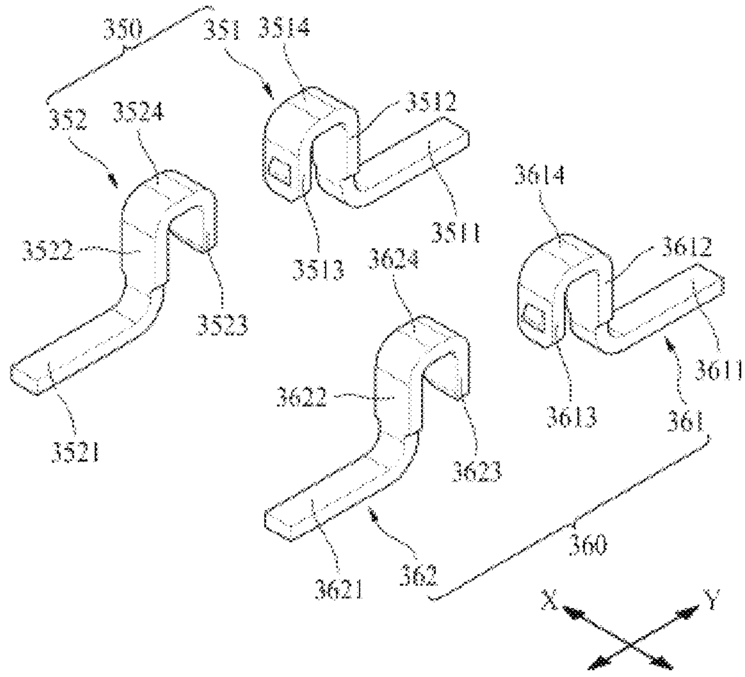
FIG. 18 is a schematic perspective view of a first ground contact and a second ground contact in a board connector according to a second embodiment.

As shown in FIG. 18, the first ground contact 350 may include a first-1 ground contact 351.

The first-1 ground contact 351 may be disposed between a part of the first RF contact 311 and the transmission contacts 320 based on the first axial direction (X-axis direction). The first-1 ground contact 351 may be disposed between a part of the first RF contact 311 and the first transmission contacts 321 based on the first axial direction (X-axis direction).

Referring to FIG. 18, the first-1 ground contact 351 may include the first-1 ground mounting member 3511 and the first-1 ground joint member 3512.

The first-1 ground mounting member 3511 is mounted on the second board. The first-1 ground mounting member 3511 may be grounded by being mounted on the second board. Accordingly, the first-1 ground contact 351 may be grounded to the second board through the first-1 ground mounting member 3511. The first-1 ground mounting member 3511 may protrude from the first-1 ground joint member 3511 along the second axial direction (Y-axis direction). The first-1 ground mounting member 3512 may be formed in a plate shape disposed in the horizontal direction.

The first-1 ground joint member 3512 is for being connected to the ground contact of a counterpart connector. The first ground contact 350 may be connected to a ground housing belonging to the counterpart connector through the first-1 ground joint member 3512, and thus be electrically connected to the ground housing belonging to the counterpart connector. Therefore, the shielding force of the first ground contact 350 with respect to the first RF contacts 311 may be strengthened. For example, the first-1 ground joint member 3512 may be connected to the first-1 movable ground inner wall 234 belonging to the first ground contact 250 of the board connector 200 according to the first embodiment. The first-1 ground joint member 3512 may be formed in a plate shape disposed in the vertical direction. In this case, the first-1 ground joint member 3512 may be implemented to be disposed in the vertical direction through bending processing with respect to a plate material.

The first-1 ground contact 351 may include a first-1 ground movable arm 3513.

The first-1 ground movable arm 3513 is for being connected to the ground contact of the counterpart connector. The first-1 ground movable arm 3513 is elastically moved as it is pressed by the ground contact of the counterpart connector inserted into the inner space 330*a*. Accordingly, the board connector 300 according to the second embodiment may stably maintain a connection with the ground contact of the counterpart connector even when an impact is applied from the outside, thanks to the first-1 ground movable arm 3513. Accordingly, as the contact stability of the board connector 1 according to the present disclosure is further improved, shielding performance for the first RF contact 311 may be further strengthened. The first-1 ground movable arm 3513 may be disposed to be spaced apart from the first-1 ground joint member 3512 based on the second axial direction (Y-axis direction). In this case, the first-1 ground movable arm 3513 may be disposed to face the first-1 ground joint member 3512 based on the second axial direction (Y-axis direction).

As shown in FIGS. 2 and 13, the first-1 ground joint member 3512 may be connected to the ground housing of the counterpart connector. For example, the first-1 ground joint member 3512 may be connected to the first-1 movable arm 2352 belonging to the first-1 movable ground inner wall 234 in the board connector 200 according to the first embodiment. The first-1 ground movable arm 3513 may be connected to the ground contact of the counterpart connector. For example, the first-1 ground movable arm 3513 may be connected to the first-2 ground joint member 254 belonging to the first ground contact 250 in the board connector 200 according to the first embodiment. Therefore, the board connector 200 according to the first embodiment and the board connector 300 according to the second embodiment may implement a double contact point structure at a grounded portion. In this case, in the double contact point structure, the first-1 movable arm 2352 of the board connector 200 according to the first embodiment and the first-1 ground movable arm 3513 of the board connector 300 according to the second embodiment may be elastically moved. Therefore, the board connector 1 according to the present disclosure may stably maintain the connection in the grounded portion even when an impact is applied from the outside, due to not only the double contact point structure in the grounded portion but also the elastically moving member.

For example, referring to FIG. 13, in the board connector 1 according to the present disclosure, the board connector 200 according to the first embodiment and the board connector 300 according to the second embodiment may be coupled to each other to form a movable contact point (MCP). The first-1 ground joint member 3512 may be connected to the first-1 movable arm 2352 belonging to the first-1 movable ground inner wall 234 in the board connector 200 according to the first embodiment to form the movable contact point (MCP). In addition, the first-1 ground movable arm 3513 may be connected to the first-2 ground joint member 254 belonging to the first ground contact 250 in the board connector 200 according to the first embodiment to form the movable contact point (MCP). As such, a plurality of movable contact points (MCPs) may be formed in the board connector 1 according to the present disclosure. Although FIG. 13 illustrates that four movable contact points (MCPs) are formed, the present disclosure is not limited thereto, and the movable contact point (MCP) may be implemented in four or more.

The first-1 ground contact 351 may include a first-1 ground connection member 3514.

The first-1 ground connection member 3514 is coupled to each of the first-1 ground joint member 3512 and the first-1 ground movable arm 3513. The first-1 ground connection member 3514 may connect the first-1 ground joint member 3512 and the first-1 ground movable arm 3513. The first-1 ground connection member 3514 extends from the first-1 ground movable arm 3513 along the second axial direction (Y-axis direction). As the first-1 ground movable arm 3513 may be elastically moved with respect to a portion coupled to the first-1 ground connection member 3514 as it is pressed by the ground contact of the counterpart connector. Therefore, the board connector 300 according to the second embodiment may stably maintain a connection with the ground contact of the counterpart connector even when an impact is applied from the outside, thanks to the first-1 ground connection member 3514. Accordingly, as the contact stability of the board connector 1 according to the present disclosure is further improved, shielding performance for the first RF contact 311 may be further strengthened. The first-1 ground connection member 3514 may be formed in a plate shape disposed in the vertical direction.

As shown in FIG. 18, the first ground contact 350 may include a first-2 ground contact 352. The first-2 ground contact 352 may include a first-2 ground mounting member 3521, a first-2 ground joint member 3522, a first-2 ground movable arm 3523, and a first-2 ground connection member 3524. In this case, the first-2 ground mounting member 3521, the first-2 ground joint member 3522, the first-2 ground movable arm 3523, and the first-2 ground connection member 3524 may be implemented to be approximately aligned with the first-1 ground mounting member 3511, the first-1 ground joint member 3512, the first-1 ground movable arm 3513, and the first-1 ground connection member 3514, respectively, and thus a detailed description thereof will be omitted.

In addition, the board connector 300 according to the second embodiment may include a second ground contact 360. The second ground contact 360 may include a second-1 ground contact 361 and a second-2 ground contact 362.

The second-1 ground contact 361 may include a second-1 ground mounting member 3611, a second-1 ground joint member 3612, a second-1 ground movable arm 3613, and a second-1 ground connection member 3614. In this case, the second-1 ground mounting member 3611, the second-1 ground joint member 3612, the second-1 ground movable arm 3613, and the second-1 ground connection member 3614 may be implemented to be approximately aligned with the first-1 ground mounting member 3511, the first-1 ground joint member 3512, the first-1 ground movable arm 3513, and the first-1 ground connection member 3514, respectively, and thus a detailed description thereof will be omitted.

In addition, the second-2 ground contact 362 may include a second-2 ground mounting member 3621, a second-2 ground joint member 3622, a second-2 ground movable arm 3623, and a second-2 ground connection member 3624. In this case, the second-2 ground mounting member 3621, the second-2 ground joint member 3622, the second-2 ground movable arm 3623, and the second-2 ground connection member 3624 may be implemented to be approximately aligned with the first-2 ground mounting member 3521, the first-2 ground joint member 3522, the first-2 ground movable arm 3523, and the first-2 ground connection member 3524, respectively, and thus a detailed description thereof will be omitted.

The second ground contact 260 and the first ground contact 250 may be formed in the same shape as each other. Accordingly, the board connector 200 according to the first embodiment may improve ease of manufacturing operations for manufacturing each of the second ground contact 260 and the first ground contact 250.

Referring to FIGS. 2 and 15 to 17, in the board connector 300 according to the second embodiment, the ground housing 330 may be implemented as follows.

The ground housing 330 may include a ground inner wall 331, a ground outer wall 332, and a ground connection wall 333.

The ground inner wall 331 faces the insulating portion 340. The ground inner wall 331 may be disposed to face the inner space 330*a*. The first ground contact 350 and the second ground contact 360 may be connected to the ground inner wall 331, respectively. The ground inner wall 331 may be disposed to surround all sides based on the inner space 330*a*. Although not shown, the ground inner wall 331 may include a plurality of sub ground inner walls, and may be implemented such that the sub ground inner walls are disposed on different sides based on the inner space 330*a*.

The ground inner wall 331 may be connected to the ground housing of the counterpart connector inserted into the inner space 330*a*. For example, as shown in FIGS. 13 and 14, the ground inner wall 331 may be connected to the ground housing 230 of the counterpart connector. As such, the board connector 300 according to the second embodiment may further strengthen the shielding function through the connection between the ground housing 330 and the ground housing of the counterpart connector. In addition, the board connector 300 according to the second embodiment may reduce an electrical adverse effect, such as crosstalk, which may be caused by inductance or capacitance between terminals adjacent to each other through the connection between the ground housing 330 and the ground housing of the counterpart connector. In this case, the board connector 300 according to the second embodiment may secure a path through which electromagnetic waves are introduced into at least one ground among the first board and the second board, and thus may further strengthen the EMI shielding performance.

The ground outer wall 332 is spaced apart from the ground inner wall 331. The ground outer wall 332 may be disposed outside the ground inner wall 331. The ground outer wall 332 may be disposed to surround all sides based on the ground inner wall 331. The ground outer wall 332 and the ground inner wall 331 may be implemented as a double shielding wall that surrounds a side of the inner space 330*a*. The first RF contact 311 and the second RF contact 312 may be located in the inner space 330*a* surrounded by the shielding wall. Accordingly, the ground housing 330 may implement a shielding function for the RF contacts 210 using a shielding wall. Therefore, the board connector 200 according to the first embodiment may contribute to further improving EMI shielding performance and EMC performance by using the shielding wall.

The ground outer wall 332 may be grounded by being mounted on the second board. In this case, the ground housing 330 may be grounded through the ground outer wall 332. When one end of the ground outer wall 332 is coupled to the ground connection wall 333, the other end of the ground outer wall 332 may be mounted on the first board. In this case, the ground outer wall 332 may be formed to have a higher height than the ground inner wall 331.

The ground connection wall 333 is coupled to each of the ground inner wall 331 and the ground outer wall 332. The ground connection wall 333 may be disposed between the ground inner wall 331 and the ground outer wall 332. The ground inner wall 331 and the ground outer wall 332 may be electrically connected to each other through the ground connection wall 333. Accordingly, when the ground outer wall 332 is mounted on the first board and grounded, the ground connection wall 333 and the ground inner wall 331 may also be grounded, thereby implementing a shielding function.

The ground connection wall 333 may be coupled to each of one end of the ground outer wall 332 and one end of the ground inner wall 331. Referring to FIG. 15, one end of the ground outer wall 332 may correspond to an upper end of the ground outer wall 332 and one end of the ground inner wall 331 may correspond to an upper end of the ground inner wall 331. The ground connection wall 333 may be formed in a plate shape disposed in a horizontal direction, and the ground outer wall 332 and the ground inner wall 331 may be formed in a plate shape disposed in a vertical direction, respectively. The ground connection wall 333, the ground outer wall 332, and the ground inner wall 331 may be integrally formed.

The ground connection wall 333 may be connected to the ground housing of the counterpart connector inserted into the inner space 330*a*. Accordingly, since the ground outer wall 332 and the ground connection wall 333 are connected to the ground housing of the counterpart connector, the board connector 200 according to the first embodiment may further strengthen the shielding function by increasing a contact area between the ground housing 330 and the ground housing of the counterpart connector.

Here, the ground housing 330 may implement a shielding function together with the first ground contact 350 for the first RF contact 311. The ground housing 330 may implement a shielding function together with the second ground contact 360 for the second RF contact 312.

Figure 17:
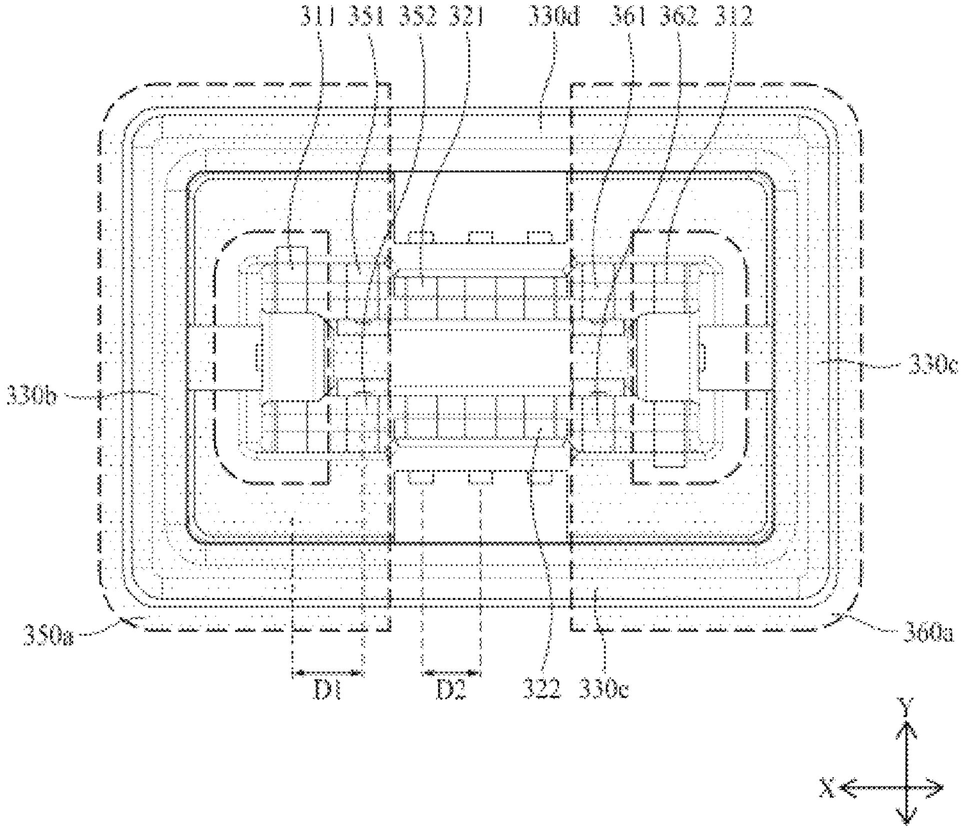
FIG. 17 is a conceptual plan view for explaining a ground loop in a board connector according to a second embodiment.

In this case, as shown in FIG. 17, the ground housing 330 may include a first shielding wall 330*b*, a second shielding wall 330*c*, a third shielding wall 330*d*, and a fourth shielding wall 330*e*. The first shielding wall 330*b*, the second shielding wall 330*c*, the third shielding wall 330*d*, and the fourth shielding wall 330*e* may be implemented by the ground inner wall 331, the ground outer wall 332, and the ground connection wall 333, respectively. The first shielding wall 330*b* and the second shielding wall 330*c* are disposed to be opposite each other based on the first axial direction (X-axis direction). The first RF contact 311 and the second RF contact 312 may be located between the first shielding wall 330*b* and the second shielding wall 330*c* based on the first axial direction (X-axis direction). The first RF contact 311 may be positioned at a position where the distance separated from the first shielding wall 330*b* is shorter than the distance separated from the second shielding wall 330*c* based on the first axial direction (X-axis direction). The second RF contact 312 may be positioned at a position where the distance separated from the second shielding wall 330*c* is shorter than the distance separated from the first shielding wall 330*b* based on the first axial direction (X-axis direction). The third shielding wall 330*d* and the fourth shielding wall 330*e* are disposed to be opposite each other based on the second axial direction (Y-axis direction). The first RF contact 311 and the second RF contact 312 may be located between the third shielding wall 330*d* and the fourth shielding wall 330*e* based on the second axial direction (Y-axis direction).

The first ground contact 350 may be disposed between the first RF contact 311 and the transmission contacts 320 based on the first axial direction (X-axis direction). In this case, the first-1 ground contact 351 and the first-2 ground contact 352 may be disposed between the first RF contact 311 and the transmission contacts 320 based on the first axial direction (X-axis direction). Accordingly, the first RF contact 311 may be positioned between the first shielding wall 230*b* and the first ground contact 350 based on the first axial direction (the X-axis direction), and may be positioned between the third shielding wall 330*d* and the fourth shielding wall 330*e* based on the second axial direction (the Y-axis direction). Therefore, the board connector 300 according to the second embodiment may strengthen a shielding function for the first RF contact 311 by using the first ground contact 350, the first shielding wall 330*b*, the third shielding wall 330*d*, and the fourth shielding wall 330*e*. In this case, the first ground contact 350, the first shielding wall 330*b*, the third shielding wall 330*d*, and the fourth shielding wall 330*e* may implement the first ground loop 350*a* (shown in FIG. 17) for the first RF contact 311. Therefore, the board connector 300 according to the second embodiment may further enhance shielding function for the first RF contact 311 by using the first ground loop 350*a*, thereby realizing complete shielding for the first RF contact 311.

The board connector 300 according to the second embodiment may implement a second ground loop 360*a* (shown in FIG. 17) for the second RF contact 312 by using the second ground contact 360 and the ground housing 330. Therefore, the board connector 300 according to the second embodiment may further enhance shielding performance for the second RF contact 312 by using the second ground loop 360*a*, thereby realizing complete shielding for the second RF contact 212.

The first ground contact 350 and the second ground contact 360 may be formed in the same shape as each other. Accordingly, the board connector 300 according to the second embodiment may improve ease of manufacturing operations for manufacturing each of the first ground contact 350 and the second ground contact 360. In addition, the board connector 300 according to the second embodiment may further improve ease of manufacturing operations for manufacturing the first ground contact 350 and the second ground contact 360 because the first ground contact 350 and the second ground contact 360 are formed in the same shape as each other and thus are implemented in different arrangement directions.

The first RF contact 311 may be disposed at a position spaced apart at the same distance from each of the first shielding wall 330*b* and the first ground contact 350 based on the first axial direction (X-axis direction), and may be disposed at a position spaced apart at the same distance from each of the third shielding wall 330*d* and the fourth shielding wall 330*e* based on the second axial direction (Y-axis direction). Accordingly, the first RF contact 311 may be disposed in the middle of the first shielding wall 330*b* and the first ground contact 350 based on the first axial direction (the X-axis direction), and may be disposed in the middle of the third shielding wall 330*d* and the fourth shielding wall 330*e* based on the second axial direction (the Y-axis direction). That is, the first RF contact 311 may be disposed in the middle of the first ground loop 350*a*. Therefore, the board connector 300 according to the second embodiment may minimize a deviation in shielding performance for the first RF contact 311 by equally implementing a distance from each portion implementing shielding for the first RF contact 311.

In this case, the first-1 ground contact 351, the first-2 ground contact 352, the first shielding wall 330*b*, the third shielding wall 330*d*, and the fourth shielding wall 330*e* may implement the first ground loop 350*a* (shown in FIG. 17) for the first RF contact 311. Therefore, the board connector 300 according to the second embodiment may further enhance shielding function for the first RF contact 311 by using the first ground loop 350*a*, thereby realizing complete shielding for the first RF contact 311.

Referring to FIGS. 13 and 15 to 18, the insulating portion 340 may include a first-1 movable groove 345 and a first-2 movable groove 346.

The first-1 movable groove 345 is for inserting the first-1 ground movable arm 3513. The first-1 ground movable arm 3513 may be inserted into the first-1 movable groove 345 as it is pressed by the ground contact of the counterpart connector. Accordingly, the first-1 ground movable arm 3513 may stably maintain the connection with the ground contact of the counterpart connector through the first-1 movable groove 345. Accordingly, the board connector 300 according to the second embodiment may further strengthen the shielding performance of the first RF contact 311 by stably maintaining the connection even when an impact is applied from the outside.

Since the first-2 movable groove 346 may be implemented to be approximately aligned with the first-1 movable groove 345, a detailed description thereof will be omitted. The first-2 ground movable arm 3523 may be inserted into the first-2 movable groove 346.

Meanwhile, referring to FIGS. 2 to 4, and 19, the first RF contact 311 may be implemented as follows. The first RF contact 311 may include a first-1 RF joint member 3112.

The first-1 RF joint member 3112 is for being connected to the RF contact of the counterpart connector. The first RF contact 311 may be electrically connected to the RF contact belonging to the counterpart connector by being connected to the RF contact belonging to the counterpart connector through the first-1 RF joint member 3112. The first-1 RF joint member 3112 may be coupled to the first RF mounting member 3111.

The first-2 RF joint member 3113 is for being connected to the RF contact of the counterpart connector. The first RF contact 311 may be electrically connected to the RF contact belonging to the counterpart connector by being connected to the RF contact belonging to the counterpart connector through the first-2 RF joint member 3113. The first-2 RF joint member 3113 may be disposed to be spaced apart from the first-1 RF joint member 3112 based on the second axial direction (Y-axis direction).

The first RF contact 311 may include a first-1 RF connection member 3114.

The first-1 RF connection member 3114 connects the first-1 RF joint member 3112 and the first-2 RF joint member 3113. The first-1 RF connection member 3114 may connect the first-1 RF joint member 3112 and the first-2 RF joint member 3113 disposed to face each other based on the second axial direction (Y-axis direction). In this case, a portion of the insulating portion 340 may be inserted between the first RF connection member 3114, the first-1 RF joint member 3112, and the first-2 RF joint member 3113.

For example, the insulating member 341 may be inserted between the first RF connection member 3114, the first-1 RF joint member 3112, and the first-2 RF joint member 3113. Accordingly, the first RF contact 311 may be supported by the insulating member 341.

The first RF contact 311 may include a first RF carrier member 3116.

The first RF carrier member 3116 protrudes from the first RF mounting member 3111. The first RF carrier member 3116 may protrude from the first RF mounting member 3111 along the first axial direction (X-axis direction). The first RF carrier member 3116 may protrude from the first RF mounting member 3111 toward the first shielding wall 230*b*. The first RF carrier member 3116 may be mounted on the second board at a position protruding toward the first shielding wall 230*b*. In this case, the first RF carrier member 3116 may be connected to a circuit line disposed on the first board at the side of the first shielding wall 330*b*. As such, since the first RF carrier member 3116 is disposed at a position different from a position at which the first-1 RF joint member 3112 or the first-2 RF joint member 3114 is formed, in the board connector 300 according to the second embodiment, the first RF contact 311 may form a double contact point structure with the RF contact of the counterpart connector through the first RF carrier member 3116. The first RF contact 311 may be manufactured through bending processing with respect to a plate material.

The first RF contact 311 may include a first RF contact avoidance groove 3116.

The first RF contact avoidance groove 3116 is formed in the first RF connection member 3114. A portion in which the first RF contact avoidance groove 3116 is formed may be disposed at a lower height than a portion connected to the first-1 RF joint member 3112 and a portion connected to the first-2 RF joint member 3113. Accordingly, in the board connector 300 according to the second embodiment, a portion of the insulation portion 340 may be disposed in the portion in which the first RF contact avoidance groove 3116 is formed (shown in FIG. 14). Therefore, the first RF contact 311 may not form a contact point at a portion where the RF contact of the counterpart connector and the first RF contact avoidance groove 3116 are formed. As such, in the board connector 300 according to the second embodiment, signal transmission performance of the first RF contact 311 can be improved through the first RF contact avoidance groove 3116.

The highest point of the first RF contact 311 may be lower than the highest point of each of the transmission contacts 320 and the highest point of each of the first ground contacts 350 based on a third axial direction perpendicular to each of the first axial direction (X-axis direction) and the second axial direction (Y-axis direction).

Figure 19:
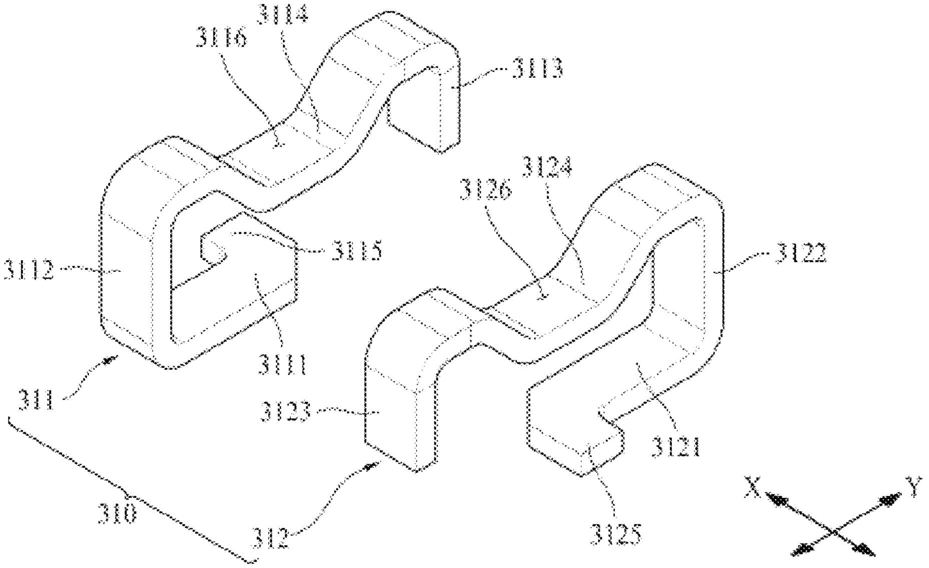
FIG. 19 is a schematic perspective view of a first RF contact and a second RF contact in a board connector according to a second embodiment.

As shown in FIG. 19, the second RF contact 312 may include a second RF mounting member 3121, a second-1 RF joint member 3122, a second-2 RF joint member 3123, a second RF connection member 3124, a second RF carrier member 3125, and a second RF contact avoidance groove 3126. In this case, the second RF mounting member 3121, the second-1 RF joint member 3122, the second-2 RF joint member 3123, the second RF connection member 3124, the second RF carrier member 3125, and the second RF contact avoidance groove 3126 may be implemented to be approximately aligned with the first RF mounting member 3111, the first-1 RF joint member 3112, the first-2 RF joint member 3113, the first RF connection member 3114, the first RF carrier member 3115, and the first RF contact avoidance groove 3116, respectively, and thus a detailed description thereof will be omitted.

Figure 20:
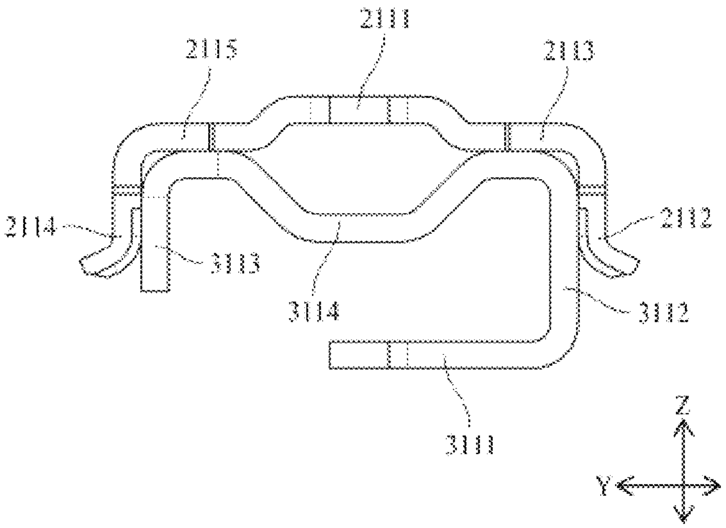
FIG. 20 is a schematic side view showing a state in which a first RF contact in a board connector according to a first embodiment and a first RF contact in a board connector according to a second embodiment are coupled.

Referring to FIGS. 14 and 20, the first RF contact 211 in the board connector 200 according to the first embodiment and the first RF contact 311 in the board connector 300 according to the second embodiment may be coupled to each other. In this case, the first RF contact 211 and the first RF contact 311 may be connected to each other. Accordingly, the first RF contact 211 and the first RF contact 311 may be electrically connected to each other. The first RF contact 211 and the first RF contact 311 may form a dual contact point with each other. In this case, the first-1 RF joint member 2112 belonging to the first RF contact 211 may be connected to the first-2 RF joint member 3113 belonging to the first RF contact 311. The first-2 RF joint member 2114 belonging to the first RF contact 211 may be connected to the first-1 RF joint member 3112 belonging to the first RF contact 311. As such, the board connector 1 according to the present disclosure may stably maintain a connection by forming the dual contact point between the first RF contact 211 of the board connector 200 according to the first embodiment and the first RF contact 311 of the board connector 300 according to the second embodiment, compared to the case where one contact is formed.

It will be apparent to those skilled in the art that the present disclosure is not limited to the above-described embodiments and the accompanying drawings, and various substitutions, modifications and changes are possible within a range which does not depart from the technical idea of the present disclosure.

What is claimed is:

1. A board connector, comprising:

a plurality of RF contacts for RF signal transmission;

an insulating portion configured to support the RF contacts;

a plurality of transmission contacts coupled to the insulating portion;

a ground housing coupled to the insulating portion;

a first ground contact configured to shield between a first RF contact among the RF contacts and transmission contacts based on a first axial direction (X-axis direction);

wherein:

the ground housing comprises a ground side wall surrounding a side of an inner space, a ground upper wall coupled to the ground side wall, and a first-1 movable ground inner wall coupled to the ground upper wall, and the first-1 movable ground inner wall is moved as it is pressed by a ground contact of a counterpart connector inserted into the inner space.

2. The board connector of claim 1, wherein:

the first ground contact comprises a first-1 ground joint member configured to be connected to the ground contact of the counterpart connector, and the first-1 movable ground inner wall and the first-1 ground joint member are disposed to face each other based on a second axial direction (Y-axis direction) perpendicular to the first axial direction (X-axis direction) and are connected to different portions of the ground contact of the counterpart connector.

3. The board connector of claim 1, wherein:

the first-1 movable ground inner wall comprises a first-1 movable arm configured to be connected to the ground contact of the counterpart connector, and a first-1 inner wall connection member coupled to each of the first-1 movable arm and the ground upper wall, and the first-1 movable arm is elastically moved based on a portion coupled to the first-1 inner wall connection member as it is pressed by the ground contact of the counterpart connector.

4. The board connector of claim 1, wherein:

the insulating portion comprises a first-1 movable groove configured to insert the first-1 movable ground inner wall, and the first-1 movable ground inner wall is inserted into the first-1 movable groove as it is pressed by the ground contact of the counterpart connector.

5. The board connector of claim 1, wherein the first ground contact comprises:

a first-1 ground mounting member mounted on the board; a first-2 ground mounting member spaced apart from the first-1 ground mounting member based on a second axial direction (Y-axis direction) perpendicular to the first axial direction (X-axis direction);

a first-1 ground joint member configured to be connected to the ground contact of the counterpart connector;

a first-2 ground joint member spaced apart from the first-1 ground joint member based on the second axial direction (Y-axis direction); and a first ground connection member-coupled to each of the first-1 ground joint member and the first-2 ground joint member.

6. The board connector of claim 5, wherein:

the insulating portion is inserted between the first-1 ground joint member and the first-2 ground joint member to support the first ground contact, and the first-1 ground mounting member and the first-2 ground mounting member are mounted on the board outside of the insulating portion.

7. The board connector of claim 5, wherein:

the first ground contact comprises a plurality of the first ground connection member, a plurality of the first-1 ground joint member, and a plurality of the first-2 ground joint member, and each of the first ground connection members connects different first-1 ground joint member and first-2 ground joint member.

8. The board connector of claim 5, wherein:

the first ground contact comprises a first ground fixing member protruding from the first ground connection member in the first axial direction (X-axis direction), and the first ground fixing member is fixed to the insulating portion.

9. The board connector of claim 5, wherein the first ground connection member is formed to have a longer length than each of the first-1 ground mounting member and the first-2 ground mounting member based on the first axial direction (X-axis direction).

10. The board connector of claim 1, wherein:

the transmission contacts are disposed to be spaced apart from each other based on the first axial direction (X-axis direction), and a distance at which the first RF contact and the first ground contact are spaced apart from each other based on the first axial direction (X-axis direction) is longer than a distance at which the transmission contacts are spaced apart from each other.

11. The board connector of claim 1, wherein:

the ground housing comprises a first shielding wall and a second shielding wall, which are disposed to face each other based on the first axial direction (X-axis direction), and a third shielding wall and a fourth shielding wall, which are disposed to face each other between the first shielding wall and the second shielding wall based on a second axial direction (Y-axis direction) perpendicular to the first axial direction (X-axis direction), the ground contact is coupled to the insulating portion between the first shielding wall and the second shielding wall, and the first RF contact is disposed at a position spaced apart at the same distance from each of the first shielding wall and the first ground contact based on the first axial direction (X-axis direction), and is disposed at a position spaced apart at the same distance from each of the third shielding wall and the fourth shielding wall based on the second axial direction (Y-axis direction).

12. The board connector of claim 1, wherein the ground housing is formed as a continuous surface without a seam.

13. The board connector of claim 1, wherein the first RF contact comprises:

a first RF mounting member for being mounted on the board;

a first-1 RF connection member coupled to one side of the first RF mounting member based on a second axial direction (Y-axis direction) perpendicular to the first axial direction (X-axis direction);

a first-1 RF joint member coupled to the first-1 RF connection member;

a first-2 RF connection member coupled to the other side of the first RF mounting member based on the second axial direction (Y-axis direction);

a first-2 RF joint member coupled to the first-2 RF connection member; and a first RF carrier member protruding from the first RF mounting member in the first axial direction (X-axis direction).

14. A board connector, comprising:

a plurality of RF contacts for RF signal transmission;

an insulating portion configured to support the RF contacts;

a plurality of transmission contacts coupled to the insulating portion;

a ground housing coupled to the insulating portion; and a first ground contact configured to shield between a first RF contact among the RF contacts and transmission contacts based on a first axial direction (X-axis direction);

wherein:

the first ground contact comprises a first-1 ground contact shielding between first transmission contacts among the transmission contacts and the first RF contact, and a first-2 ground contact disposed to face the first-1 ground contact based on a second axial direction (Y-axis direction) perpendicular to the first axial direction (X-axis direction), and the first-1 ground contact comprises a first-1 ground movable arm for being connected to a ground contact of a counterpart connector, and the first-1 ground movable arm is elastically moved as it is pressed by the ground contact of the counterpart connector inserted into an inner space of the ground housing.

15. The board connector of claim 14, wherein:

the first-1 ground contact comprises a first-1 ground mounting member for being mounted on a board, a first-1 ground joint member-coupled to the first-1 ground mounting member, and a first-1 ground movable arm-disposed to be spaced apart from the first-1 ground joint member-based on the second axial direction (Y-axis direction), and the first-1 ground joint member and the first-1 ground movable arm are disposed to face each other based on the second axial direction (Y-axis direction), wherein the first-1 ground joint member is connected to the ground housing of the counterpart connector, and wherein the first-1 ground movable arm is connected to the ground contact of the counterpart connector.

16. The board connector of claim 14, wherein:

the first-1 ground contact comprises a first-1 ground movable arm for being connected to a ground contact of the counterpart connector, and a first-1 ground connection member extending from the first-1 ground movable arm along the second axial direction (Y-axis direction), and the first-1 ground movable arm is elastically moved based on a portion coupled to the first-1 ground connection member as it is pressed by the ground contact of the counterpart connector.

17. The board connector of claim 14, wherein:

the insulating portion comprises a first-1 movable groove configured to insert the first-1 ground movable arm, and the first-1 ground movable arm is inserted into the first-1 movable groove as it is pressed by the ground contact of the counterpart connector.

18. The board connector of claim 14, wherein the first RF contact comprises:

a first RF mounting member for being mounted on the board;

a first-1 RF joint member coupled to the first RF mounting member;

a first-2 RF joint member disposed to be spaced apart from the first-1 RF joint member based on the second axial direction (Y-axis direction);

a first RF connection member for connecting the first-1 RF joint member and the first-2 RF joint member; and a first RF carrier member-protruding from the first RF mounting member along the first axial direction (X-axis direction).

19. The board connector of claim 14, wherein the first RF contact comprises:

a first-1 RF joint member for being connected to the RF contact of the counterpart connector;

a first-2 RF joint member for being connected to the RF contact of the counterpart connector at a position spaced apart from the first-1 RF joint member-based on the second axial direction (Y-axis direction);

a first RF connection member for connecting the first-1 RF joint member and the first-2 RF joint member; and a first RF contact avoidance groove formed in the first RF connection member, wherein a portion where the first RF contact avoidance groove is formed in the first RF connection member is disposed at a lower height than a portion connected to the first-1 RF joint member and a portion connected to the first-2 RF joint member.

20. The board connector of claim 14, wherein a highest point of the first RF contact is lower than a highest point of each of the transmission contacts and a highest point of each of the first ground contacts based on a third axial direction perpendicular to each of the first axial direction (X-axis direction) and the second axial direction (Y-axis direction).

* * * * *